United States Patent
Trulli, Jr. et al.

(10) Patent No.: US 11,275,666 B1
(45) Date of Patent: Mar. 15, 2022

(54) METHOD AND APPARATUS FOR IDENTIFYING HIGH IMPORTANCE DEVICES OF A CONSISTENCY GROUP

(71) Applicant: EMC IP HOLDING COMPANY LLC, Hopkinton, MA (US)

(72) Inventors: Dennis Trulli, Jr., Littleton, MA (US); Peter Callewaert, Puurs-Sint-Amands (BE)

(73) Assignee: Dell Products, L.P., Hopkinton, MA (US)

( * ) Notice: Subject to any disclaimer, the term of this patent is extended or adjusted under 35 U.S.C. 154(b) by 6 days.

(21) Appl. No.: 17/060,161

(22) Filed: Oct. 1, 2020

(51) Int. Cl.
 *G06F 11/34* (2006.01)
 *G06F 3/06* (2006.01)
 *G06F 11/30* (2006.01)

(52) U.S. Cl.
 CPC ........ *G06F 11/3409* (2013.01); *G06F 3/0604* (2013.01); *G06F 3/0631* (2013.01); *G06F 3/0653* (2013.01); *G06F 3/0658* (2013.01); *G06F 3/0683* (2013.01); *G06F 11/3037* (2013.01)

(58) Field of Classification Search
 CPC .. G06F 11/3409; G06F 3/0658; G06F 3/0653; G06F 3/0631; G06F 3/0683; G06F 11/3037; G06F 3/0604
 See application file for complete search history.

(56) References Cited

U.S. PATENT DOCUMENTS

| | | | |
|---|---|---|---|
| 10,360,127 B1* | 7/2019 | McSweeney | G06F 11/3452 |
| 2020/0326871 A1* | 10/2020 | Wu | G06F 3/0679 |
| 2021/0042045 A1* | 2/2021 | Tatara | G06F 3/0653 |
| 2021/0096755 A1* | 4/2021 | Rajgopal | G06F 3/0671 |
| 2021/0216214 A1* | 7/2021 | Tornow | G06F 3/067 |

* cited by examiner

*Primary Examiner* — Masud K Khan
(74) *Attorney, Agent, or Firm* — Anderson Gorecki LLP

(57) ABSTRACT

A consistency group is defined to include a set of required devices on a set of storage systems. High activity devices are determined, and write dependencies between each high activity device and each low activity devices are monitored. A set of high importance devices is determined to include the high activity devices and low activity devices with a high write dependency on at least one of the high activity devices. Comparative write patterns between the high importance devices and low importance devices are used to determine a set of candidate devices for removal from the consistency group. The high importance devices, rather than all devices of the consistency group, are also used to determine a set of devices that have inadvertently not been included in the consistency group.

20 Claims, 18 Drawing Sheets

FIG. 4

| Device Activity Data Structure 310 | | | | | |
|---|---|---|---|---|---|
| System ID | Device ID | Interval #1 | ••• | Interval #n | Total Writes (epoch) |
| System #1 | Device #1 | # Writes | ••• | # Writes | Sum all intervals |
| System #1 | Device #2 | # Writes | ••• | # Writes | Sum all intervals |
| ⋮ | ⋮ | ⋮ | | ⋮ | ⋮ |
| System #1 | Device #m | # Writes | ••• | # Writes | Sum all intervals |
| System #2 | Device #1 | # Writes | ••• | # Writes | Sum all intervals |
| System #2 | Device #2 | # Writes | ••• | # Writes | Sum all intervals |
| ⋮ | ⋮ | ⋮ | | ⋮ | ⋮ |
| System #n | Device #z | # Writes | ••• | # Writes | Sum all intervals |

FIG. 5

| High Activity Device Data Structure 315 | | |
|---|---|---|
| System ID | Device ID | Total Writes (epoch) |
| System #3 | Device #3 | 18554 |
| System #1 | Device #2 | 12100 |
| System #1 | Device #1 | 421 |
| System #1 | Device #2 | 378 |
| System #2 | Device #1 | 225 |
| System #2 | Device #2 | 155 |
| System #2 | Device #3 | 100 |
| System #3 | Device #2 | 4 |
| System #3 | Device #1 | 2 |

FIG. 7

| | High Importance Device Data Structure 320 500 | | | |
|---|---|---|---|---|
| Row 1 560 | Device HIGH #1 (High Activity Device) | | Device LOW #1 (Low Activity Device) | |
| | Storage System ID 600 | Device ID 605 | Storage System ID 610 | Device ID 615 |
| | Number of times both updated 620 | | Number of times one updated 625 | |
| | Coordinated Write Probability Percentage 628 | | | |
| | Ratio 1 630 | Count 1 635 | Interval 1 640 | |
| | Ratio 2 | Count 2 | Interval 2 | |
| | ⋮ | ⋮ | ⋮ | |
| | Ratio n | Count n | Interval n | |
| Row 2 | Device HIGH #1 (High Activity Device) | | Device LOW #2 (Low Activity Device) | |
| | Storage System ID | Device ID | Storage System ID | Device ID |
| | Number of times both updated | | Number of times one updated | |
| | Coordinated Write Probability Percentage 628 | | | |
| | Ratio 1 | Count 1 | Interval 1 | |
| | Ratio 2 | Count 2 | Interval 2 | |
| | ⋮ | ⋮ | ⋮ | |
| | Ratio n | Count n | Interval n | |
| | ⋮ | | | |
| | Row z 500 | | | |

FIG. 9

| | Update Correlation Data Structure 325 _500 | | | |
|---|---|---|---|---|
| Row 1 560 | HI #1 (High Importance Device) | | LI #1 (Low Importance Device) | |
| | Storage System ID 600 | Device ID 605 | Storage System ID 610 | Device ID 615 |
| | Number of times both updated 620 | | Number of times one updated 625 | |
| | Coordinated Write Probability Percentage 628 | | | |
| | Ratio 1 630 | Count 1 635 | Interval 1 640 | |
| | Ratio 2 | Count 2 | Interval 2 | |
| | ⋮ | ⋮ | ⋮ | |
| | Ratio n | Count n | Interval n | |
| Row 2 | HI #1 (High Importance Device) | | LI #2 (Low Importance Device) | |
| | Storage System ID | Device ID | Storage System ID | Device ID |
| | Number of times both updated | | Number of times one updated | |
| | Coordinated Write Probability Percentage 628 | | | |
| | Ratio 1 | Count 1 | Interval 1 | |
| | Ratio 2 | Count 2 | Interval 2 | |
| | ⋮ | ⋮ | ⋮ | |
| | Ratio n | Count n | Interval n | |
| | ⋮ | | | |
| | Row z 500 | | | |

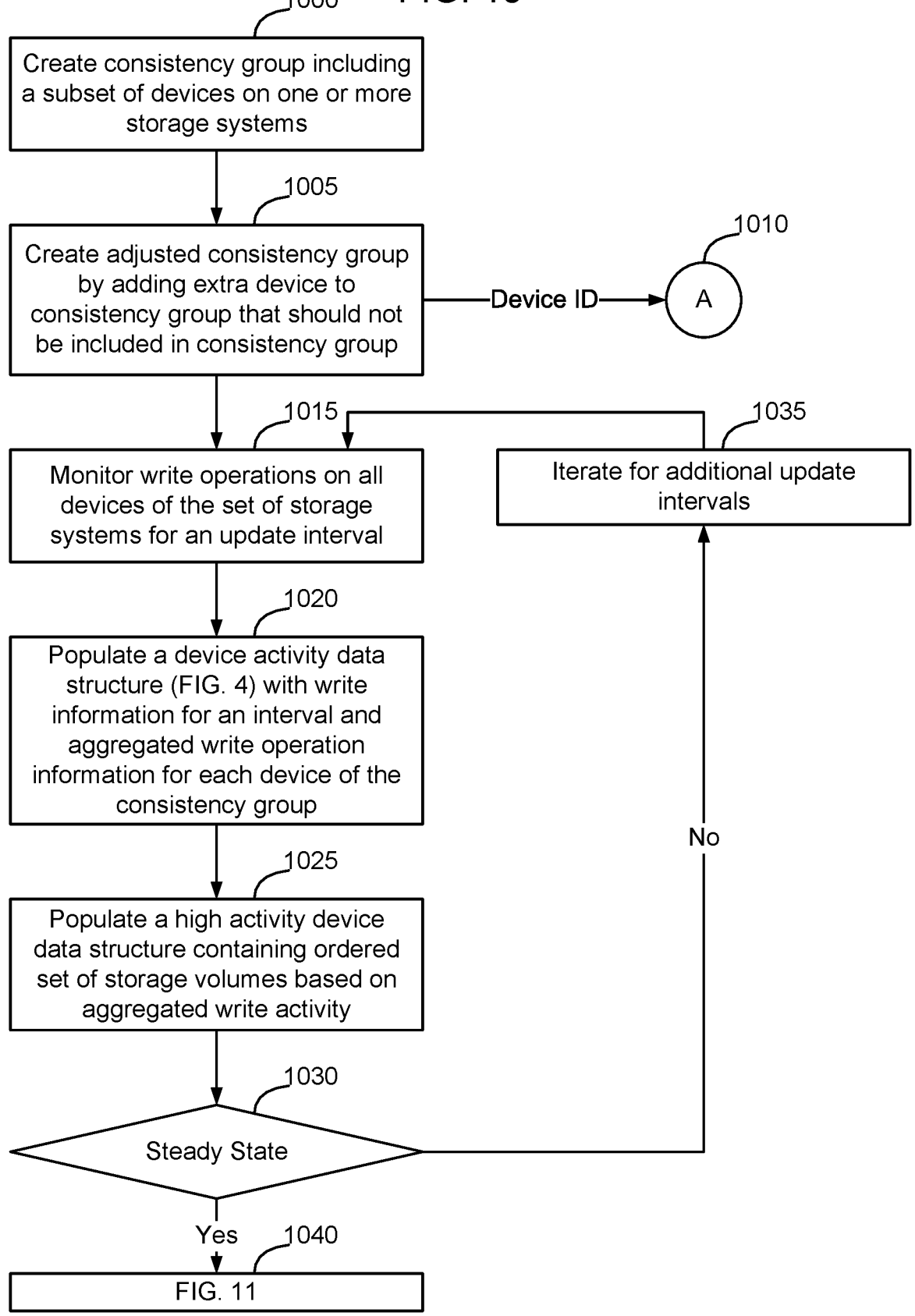

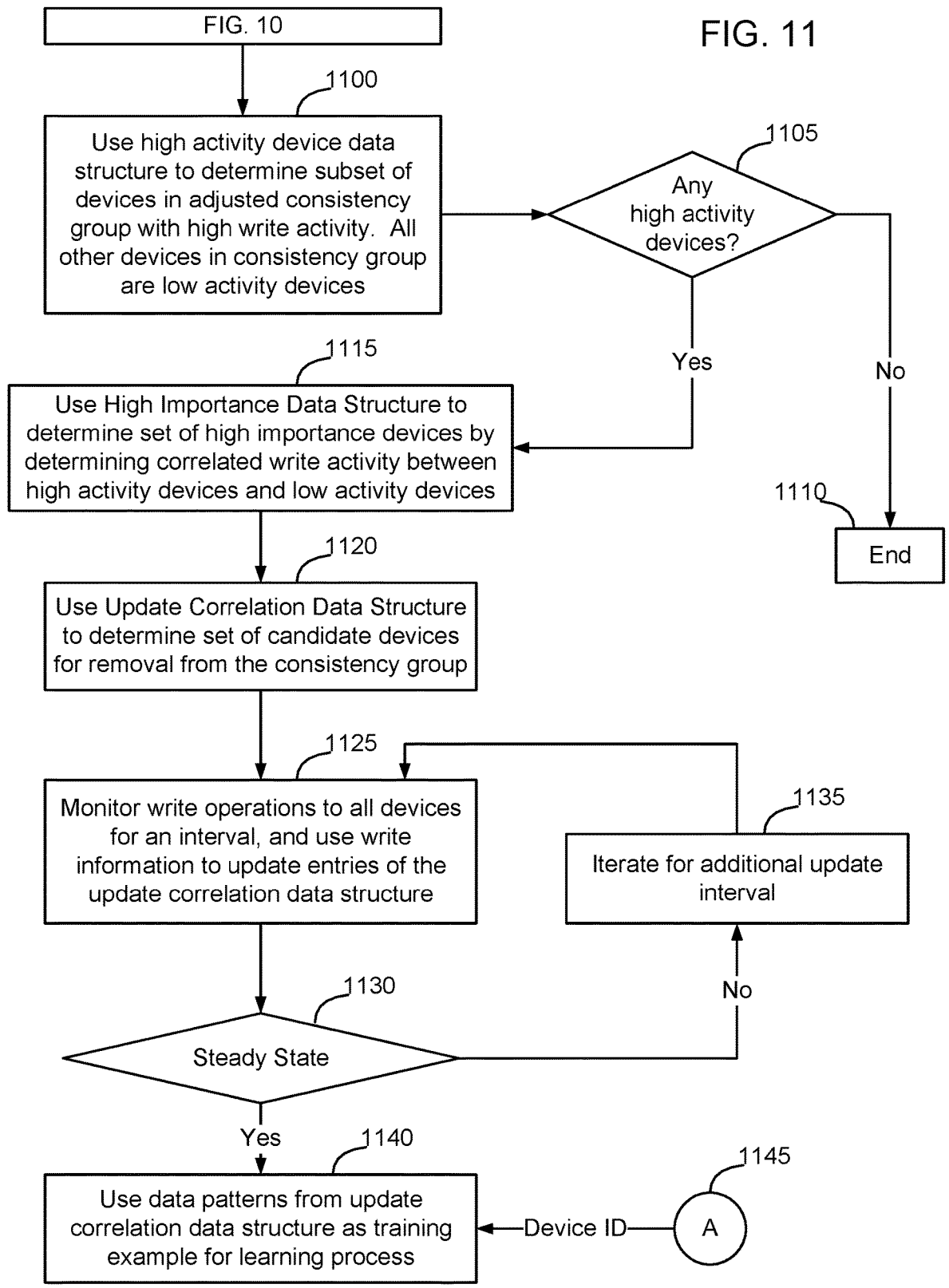

FIG. 16

Device Pairing Data Structure 1500

Table 2

| | |  |
|---|---|---|
| Row 1 | Device HIGH #1 → Device OUT #1 | X,X,X,X... |
| Row 2 | Device HIGH #1 → Device OUT #2 | X,X,X,X... |
| ... | ... | |
| Row n | Device HIGH #1 → Device OUT #n | X,X,X,X... |
| Row n+1 | Device HIGH #2 → Device OUT #1 | X,X,X,X... |
| Row n+2 | Device HIGH #2 → Device OUT #2 | X,X,X,X... |
| ... | ... | |
| Row a | Device HIGH #2 → Device OUT #n | X,X,X,X... |
| ... | ... | |
| Row b | Device HIGH #m → Device OUT #1 | X,X,X,X... |
| Row b+1 | Device HIGH #m → Device OUT #2 | X,X,X,X... |
| ... | ... | |
| Row z | Device HIGH #m → Device OUT #n | X,X,X,X... |

Meta Table

| | OUT #1 | OUT #2 | ... | OUT #n |
|---|---|---|---|---|
| HIGH #1 | 1 | 2 | ... | n |
| HIGH #2 | n+1 | n+2 | ... | a |
| ... | ... | ... | ... | ... |
| HIGH #m | b | b+1 | ... | z |

FIG. 17

| | Device Pairing Data Structure 1500 ,500 | |
|---|---|---|
| Row 1 560 | Device HIGH #1 (High Activity Device IN consistency group) | Device Out #1 (Device outside of consistency group) |
| | Storage System ID 600 / Device ID 605 | Storage System ID 610 / Device ID 615 |
| | Number of times both updated 620 | Number of times one updated 625 |
| | Coordinated Write Probability Percentage 628 | |
| | Ratio 1 630 / Count 1 635 / Interval 1 640 | |
| | Ratio 2 / Count 2 / Interval 2 | |
| | ⋮ ⋮ ⋮ | |
| | Ratio n / Count n / Interval n | |
| Row 2 | Device HIGH #1 (High Activity Device IN consistency group) | Device Out #2 (Device outside of consistency group) |
| | Storage System ID / Device ID | Storage System ID / Device ID |
| | Number of times both updated | Number of times one updated |
| | Coordinated Write Probability Percentage 628 | |
| | Ratio 1 / Count 1 / Interval 1 | |
| | Ratio 2 / Count 2 / Interval 2 | |
| | ⋮ ⋮ ⋮ | |
| | Ratio n / Count n / Interval n | |
| | ⋮ | |
| | Row z 500 | |

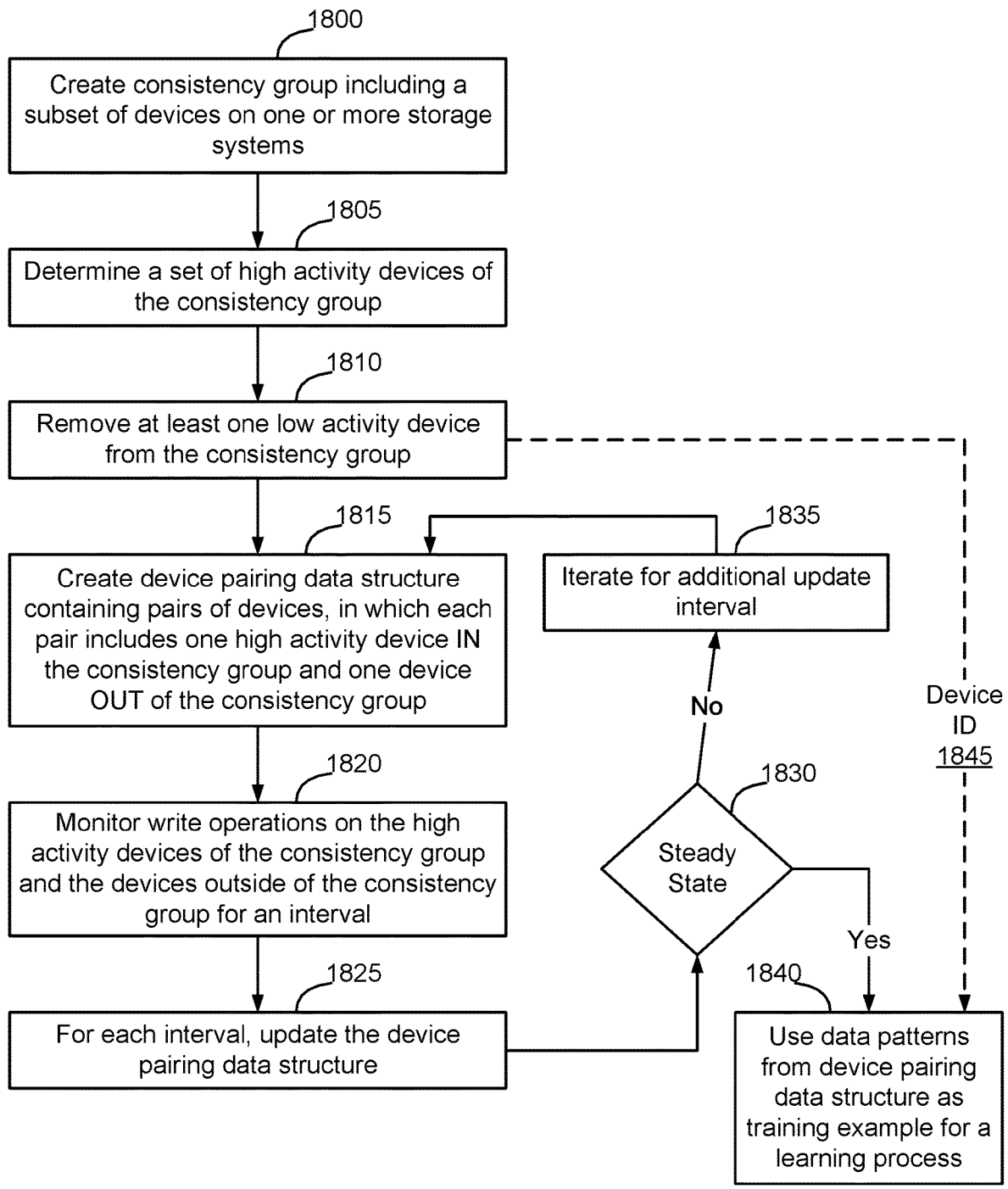

METHOD AND APPARATUS FOR IDENTIFYING HIGH IMPORTANCE DEVICES OF A CONSISTENCY GROUP

FIELD

This disclosure relates to computing systems and related devices and methods, and, more particularly, to a method and apparatus for identifying high importance devices of a consistency group.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A consistency group is defined to include a set of required devices on a set of storage systems. High activity devices are determined, and write dependencies between each high activity device and each of the low activity devices are monitored. A set of high importance devices is determined to include the high activity devices and low activity devices with a high write dependency on at least one of the high activity devices.

In some embodiments, the write patterns on each of the high activity devices are monitored and write patterns on each of the low activity devices of the consistency group are monitored. Pairs of devices are formed, in which each pair includes one high activity device and one low activity device. Write patterns of the pairs of devices are compared to determine respective percentage coordinated write probabilities for pairs of devices. Write patterns of the pairs of devices are also compared to determine ratios of write operations for pairs of devices. A coordinate write probability above a threshold, or a determined ratio of write operations that occurs sufficiently frequently, is interpreted as an indication that one of the low activity devices is a high importance device.

Once the set of high importance devices is determined, in some embodiments a set of similar data structures are used to compare write probabilities between the high importance devices and other devices (low importance devices) of the consistency group to identify write dependencies between the set of high importance devices and the other (low importance) devices in the consistency group. Low importance devices in the consistency group that do not exhibit write dependency with any of the high importance devices are candidate devices for removal from the consistency group. A learning process is trained and used to analyze the write patterns to select candidate devices for removal from a consistency group.

Once the high activity devices are determined, the write patterns on the high activity devices can also be compared with write patterns of devices outside of the consistency group to determine candidate devices to be added to the consistency group. In some embodiments, the write patterns on each of the devices outside of the consistency group are monitored. Pairs of devices are formed, in which each pair includes one high activity device and one device outside of the consistency group. Write patterns of the pairs of devices are compared to determine respective percentage coordinated write probabilities for pairs of devices. Write patterns of the pairs of devices are also compared to determine ratios of write operations for pairs of devices. A coordinate write probability above a threshold, or a determined ratio of write operations that occurs sufficiently frequently, is interpreted as an indication that one of the devices outside of the consistency group is a high importance device and should be considered for inclusion in the consistency group. A learning process is trained and used to analyze the write patterns to select candidate devices to be added to the consistency group.

BRIEF DESCRIPTION OF THE DRAWINGS

FIG. 4 is a functional block diagram of an example device activity data structure for use in the consistency group integrity application of FIG. 3, according to some embodiments.

FIG. 5 is a functional block diagram of an example high activity device data structure for use by the consistency group integrity application of FIG. 3 to determine a set of high activity devices of the consistency group, according to some embodiments.

FIG. 7 is a functional block diagram of a portion of the example high importance device data structure of FIG. 6 in greater detail, according to some embodiments.

FIG. 9 is a functional block diagram of a portion of the example update correlation data structure of FIG. 8 in greater detail, according to some embodiments.

FIGS. 10-11 are a flow chart of a method of creating training examples and using the training examples to train a learning process to identify write patterns indicative of devices that are candidates for removal from a consistency group, according to some embodiments.

FIG. 16 is a functional block diagram of an example device pairing data structure for use in the consistency group integrity application of FIG. 16, according to some embodiments.

FIG. 17 is a functional block diagram of a portion of the example device pairing data structure of FIG. 16 in greater detail, according to some embodiments.

FIG. 18 is a flow chart of a method of creating training examples and using the training examples to train a learning process to identify write patterns indicative of a device missing from a consistency group, according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

Figure 1:
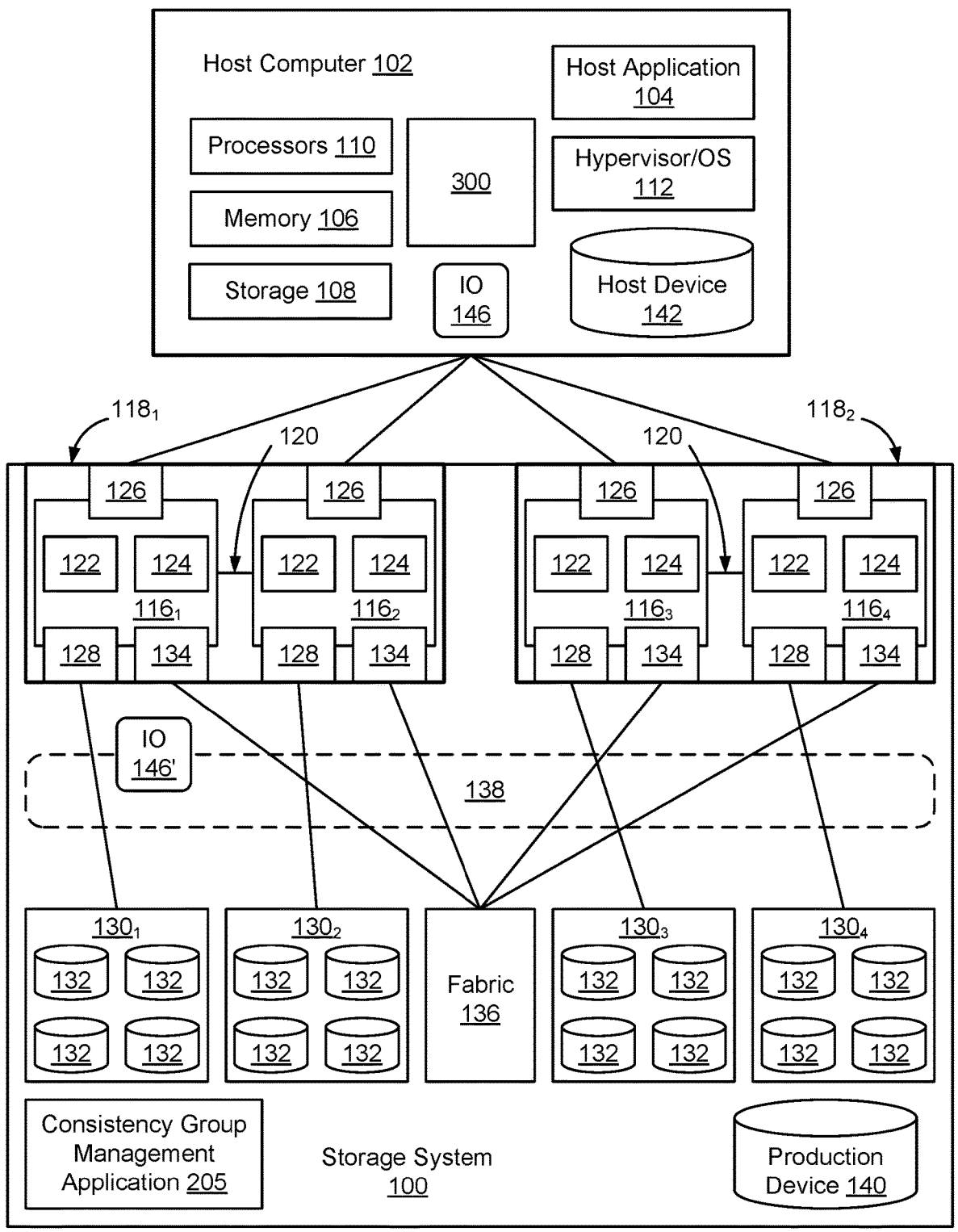
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-

$116_4$ using a PCIe bus, or may be connected to the compute nodes $116_1$-$116_4$, for example, by an IB (InfiniBand) bus or fabric.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write host application data to the storage system 100 and read host application data from the storage system 100 in order to perform various functions. Examples of host applications 104 may include but are not limited to file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer memory 106. If that is not possible then the IO 146 is sent to one of the compute nodes 116 to be serviced by the storage system 100.

There may be multiple paths between the host computer 102 and the storage system 100, e.g. one path per front-end adapter 126. The paths may be selected based on a wide variety of techniques and algorithms including, for context and without limitation, performance and load balancing. In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

Figure 2:
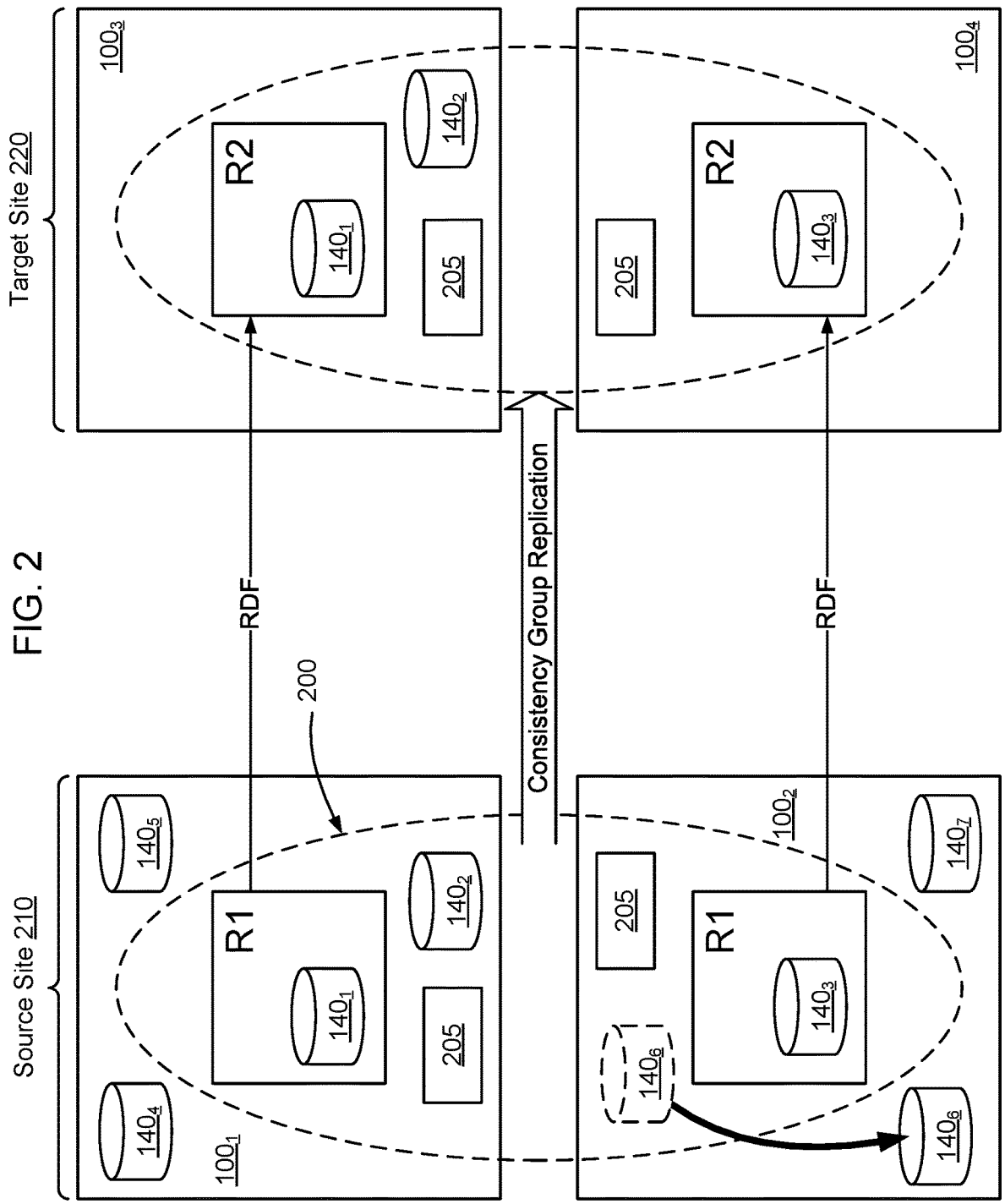
FIG. 2 is a functional block diagram of a set of storage systems having a group of devices forming a consistency group, with one device incorrectly included in the consistency group, according to some embodiments.

FIG. 2 is a functional block diagram of a set of storage systems having a group of devices 140 forming a consistency group 200, with one device $140_6$ incorrectly included in the consistency group, according to some embodiments. As used herein, the term "consistency group" is a logical collection of devices 140 on a single storage system or on a group of storage systems at a single geographical location. Although FIG. 2 shows a consistency group 200 including devices 140 in two storage systems 100, devices in the consistency group 200 may be on other numbers of storage systems 100, such as a single storage system 100 or multiple storage systems 100.

All devices 140 associated with a consistency group 200 are protected using a consistency group management application 205. The consistency group management application 205 prevents loss or corruption of data when there is a communications failure or device failure in configurations of single or multiple storage systems at the source site 210 or target site 220, by ensuring consistency of dependent write operations on the set of devices 140. Specifically, the consistency group management application 205 ensures that a dependent write cannot be done before the write it is dependent on has been acknowledged by the storage system 100. Thus, if remote replication is interrupted on one or more of the devices 140 in the consistency group 200, the consistency group management application 205 will step in to prevent remote replication for all devices 140 in the consistency group 200 in such a way that no dependent write is remotely replicated if a write that it depends on is not replicated. In this manner, the consistency group management application ensures logically consistent, restartable data copies at the remote side of the configuration. As used herein, the term "device 140" includes production devices as shown in FIG. 1 as well as collections of production devices 140 that may be organized in reproduction groups (R1 volumes).

Many applications, particularly transaction-oriented systems or database management systems, use dependent write logic for data consistency. Dependent write logic means that an attempt by an application to issue a given IO request depends on the prior successful completion of another IO operation. When a write operation occurs, the write operation may involve several dependent write steps. For example, a single write operation may include: (1) writing a record of what the storage system is going to do to a transaction log; (2) writing the data to the actual database; and (3) writing another record to the transaction log to indicate that the data was updated successfully. In this example, the three writes (log, database update, and log again) are related such that each write request is not issued until the previous related write has completed.

When a consistency group 200 is defined, it is possible that one or more devices 140 are inadvertently included in the consistency group 200 that should not have been included in the consistency group 200. For example, as shown in FIG. 2, assume consistency group 200 has been defined and is being managed by a consistency group management application 205. The consistency group management application 205 will ensure that the data of all devices in the consistency group is replicated from source site 210 to the target site 220. If a device, such as device 140₆, is inadvertently included in the consistency group, and the consistency management application 205 needs to stop operation of the consistency group, device 140₆ will unnecessarily be forced to fail over. This will cause operation on device 140₆ to stop, even though it does not have any dependent writes with any of the other devices of the consistency group 200. Accordingly, it would be preferable to be able to identify devices, such as device 140₆, that are candidates for removal from the consistency group 200.

Remote replication of the devices is handled by the storage systems 100, and, once a consistency group 200 has been defined, the consistency group management application 205 ensures that dependent write logic is enforced within the devices 140 of the consistency group 200. In the example consistency group shown in FIG. 2, for example, the consistency group management application 205 ensures that dependent write operations on devices 140₁, 140₂, 140₃, 140₆, occur and are replicated to the target site 220 in such a way to preserve the dependent write logic implemented by the host application that is performing IOs on the storage systems.

Write operations on devices 140 that are not included in the consistency group 200, such as devices 140₄ and 140₅ are not managed by the consistency group management application 205. Accordingly, removal of a device from the group 200, such as device 140₆, reduces the amount of work the consistency group management application 205 will need to implement to manage operations of the consistency group 200. Further, removal of an unnecessary device from the consistency group will allow operations on that device to continue, on the source site 210, upon failover of the consistency group. Although only seven devices 140 are shown for ease of explanation, a given consistency group 200, may have hundreds or more devices 140.

According to some embodiments, a learning process 330 (See FIG. 3) is trained to look for write patterns indicative of dependent write operations. The trained learning process 330 is then deployed to watch write patterns on a set of devices of a consistency group 140, to identify devices 140 that are candidates for removal from the consistency group 200.

Figure 3:
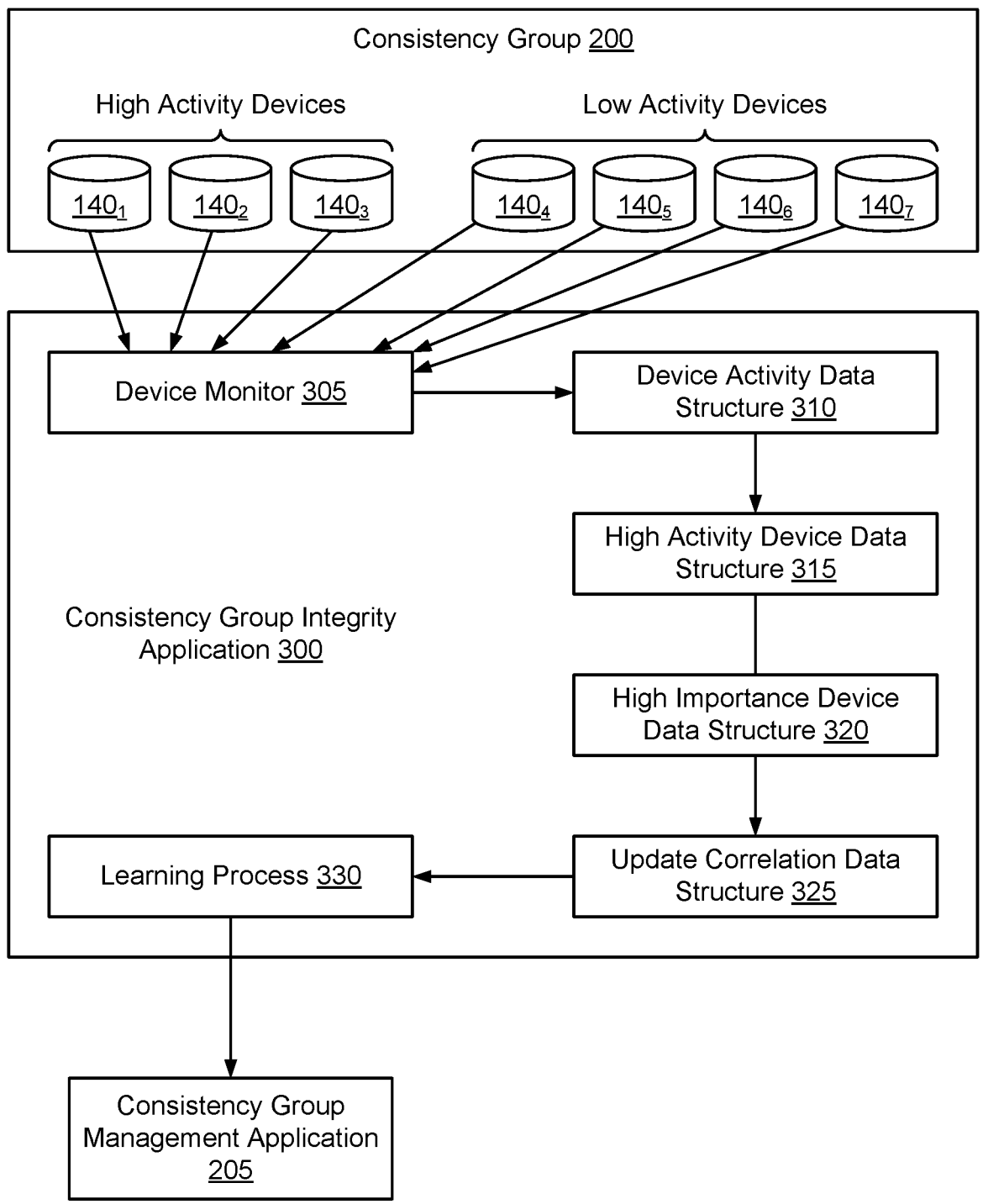
FIG. 3 is a functional block diagram of a storage environment including a consistency group integrity application configured to monitor device activity to identify high importance devices of a consistency group, according to some embodiments.

FIG. 3 is a functional block diagram of a storage environment including a consistency group integrity application 300 configured to monitor device activity to identify a set of high importance devices. Once the high importance devices are identified, in some embodiments coordinated write patterns between the high importance devices and low importance devices are determined and used to identify devices 140 that are candidates for removal from a consistency group 200. The consistency group integrity application 300 may be implemented as one or more host applications 104 on one or more hosts 102 or in another manner.

According to some embodiments, the consistency group integrity application 300 is configured to monitor write patterns on the devices of the consistency group to determine which of the devise are high activity devices. All devices that are not classified as high activity devices are classified as low activity devices. Write patterns between the high activity devices and low activity devices are then compared to determine which of the low activity devices exhibit write patterns indicative of dependent write operations relative to one or more of the high activity devices. The set of high activity devices and low activity devices that exhibit coordinated write activity with one or more of the high activity devices are determined to be high importance devices. The set of low activity devices with a low write correlation to at least one of the high activity devices are low importance devices. If a low importance device does not exhibit coordinated write activity with one or more of the high importance devices, the low importance device is a candidate for removal from the consistency group.

As noted above, when defining a consistency group 200, customers sometimes inadvertently include some devices 140 that should not be included in the consistency group 200. According to some embodiments, the consistency group integrity application 300 is configured to monitor write operations to devices 140 of the consistency group 200, to look for write patterns indicative of dependent write operations. If a device is included in the consistency group, and does not exhibit write patterns indicative of the presence of a dependent write operation, that device is a candidate device for removal from the consistency group 200.

In some embodiments, the consistency group integrity application 300 has a device monitor 305 configured to monitor write operations to the devices 140. The device monitor 305 monitors the number of write IOs to all devices 140 of the consistency group 200. Each interval, for example every five minutes, this data is aggregated into device activity data structure 310, containing the number of write updates for each device 140 during that interval as well as the total number of write operations to the device during the epoch (since the most recent reset operation). Optionally, the device activity data structure 310 also maintains information about the number of writes that occurred on each device during each interval, for a set number of intervals. The number of intervals may be determined, for example, based on how much memory is available to be used to implement the device activity data structure 310. An example device activity data structure 310 is described in greater detail below in connection with FIG. 4.

The consistency group integrity application 300 sorts the entries of the device activity data structure into an ordered list, which is maintained by the consistency group integrity application 300 using high activity device data structure 315. The entries of the high activity device data structure 315 include the device ID and the total number of write operations to the device during the epoch, and are sorted from high to low. Data is collected for a number of intervals until the order of the entries in the high activity device data structure 315 reaches a steady state. In some embodiments steady state is determined when the order of the entries of the highest activity devices stops changing within the high activity device data structure 315. An example high activity device data structure 315 is described in greater detail below in connection with FIG. 5.

Once the high activity device data structure 315 reaches a steady state, it is possible to identify the high activity devices and low activity devices. In some embodiments, the high activity devices are the set of devices that account for a large percentage of write activity. In some embodiments, the high activity devices are a set of devices that account for at least 50% of the write activity during the epoch. There are many ways of determining which devices are high activity devices depending on the embodiment. An example method of determining which devices are high activity devices is set forth below in connection with FIG. 12.

Once the high activity devices are determined, a high importance device data structure 320 is created which pairs each high activity device with each low activity device. The high importance device data structure 320 is used to identify write patterns of a dependent nature. The high importance device data structure 320 is described in greater detail below in connection with FIGS. 6-7. The high importance device data structure 320 uses write information from the device activity data structure 310 and processes the aggregated write information to enable write operations to be evaluated within a current interval and over time. This enables write operations on each of the high activity devices 140 in the consistency group 200 to be compared to write operations on each of the low activity devices 140 in the consistency group 200. Where dependent write patterns are detected between a pair of devices 140 (one high activity device in the consistency group 200 and one low activity device in the consistency group 200), the low activity device 140 is considered to be a device of high importance and should remain within the consistency group 200. If the low activity device does not exhibit write patterns indicative of dependent writes, the low activity device is a low importance device.

Figure 6:
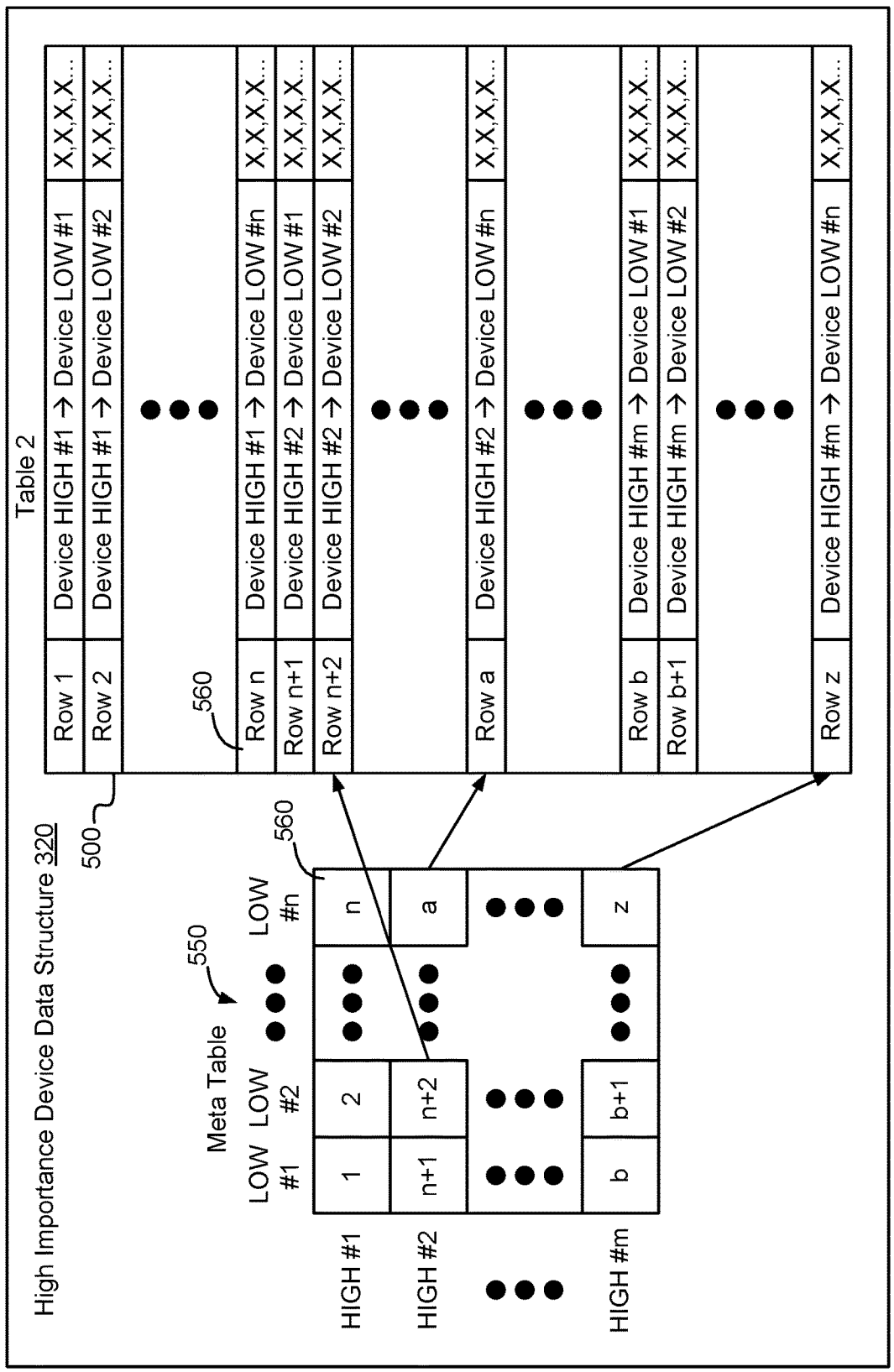
FIG. 6 is a functional block diagram of an example high importance device data structure for use by the consistency group integrity application of FIG. 3 to determine a set of high importance devices, according to some embodiments.

It is possible that some of the low importance devices are able to be safely removed from the consistency group. By contrast, other devices that were determined to be low importance devices using the data structures of FIGS. 6 and 7, may be necessary devices and should not be removed from the consistency group. In some embodiments, a set of data structures (see FIGS. 8 and 9) similar to the data structures of FIGS. 6 and 7 is used to look for correlated write activity between the low importance devices and high importance devices. If there is a strong write correlation between a low importance device and at least one of the high importance devices, the low importance device should be retained in the consistency group. If there is no write correlation between a low importance device and at least one of the high importance devices, that low importance device is a candidate for removal from the consistency group.

In some embodiments, a learning process 330 is used to look for patterns in the write operations. A process of creating training examples and using the training examples to train the learning process 330 to learn write patterns indicative of a device 140 that has been incorrectly included in a consistency group 200 is described below in greater detail in connection with FIGS. 10-11 and 13. In some embodiments, the learning process 330 is a deep neural network learning process, although other recursive learning processes or classification learning processes may be used depending on the implementation.

FIG. 4 is a functional block diagram of an example device activity data structure 310. As shown in FIG. 4, in some embodiments, the device activity data structure 310 is a table having a row 400 for each device 140 included in the consistency group 200. Although the example device activity data structure 310 is shown in FIG. 4 as a table, other data structures may similarly be used.

The device activity data structure 310, in some embodiments, includes aggregated write activity for each individual device, in the form of the number of write operations that occurred on the device 140 during a set of monitoring intervals, as well as the total number of writes on the device during the epoch. The term "epoch" as used herein, refers to the total amount of time (one or more monitoring intervals) since a reset event. Reset events occur periodically to cause the total write values of all entries in the device activity data structure 310 to be reset to zero. An example interval length may be five minutes, but other interval lengths could be used as well. The write activity may be detected by the device monitor 305 by looking at the system call data on each device 140, or may be collected in other ways depending on the implementation.

In some embodiments, the device activity data structure 310 includes historic write activity for each of the devices, indicating how many writes occurred to each of the individual devices during the particular monitoring interval. Depending on the amount of memory available, the device activity data structure 310 may maintain this device specific write information for all intervals of the epoch, or for a subset of intervals of the epoch. For example, the amount of available memory to implement the device activity data structure may be determined, as well as the total number of devices of the consistency group, and used to determine how many interval specific write entries should be maintained by the device activity data structure 310.

FIG. 5 is a functional block diagram of an example high activity device data structure 315 for use by the consistency group integrity application of FIG. 3 to determine a set of high activity devices of the consistency group, according to some embodiments. As shown in FIG. 5, the consistency group integrity application 300 sorts the entries of the device activity data structure 310 into an ordered list, which is maintained by the consistency group integrity application 300 using high activity device data structure 315. The entries of the high activity device data structure 315 include the device ID and the total number of write operations to the device during the epoch, and are sorted from high to low. Data is collected for a number of intervals until the order of the entries in the high activity device data structure 315 reach a steady state. In some embodiments steady state is determined when the order of the entries of the highest activity devices stop changing within the high activity device data structure 315.

Once the high activity device data structure 315 reaches a steady state, it is possible to identify the high activity devices and low activity devices. In some embodiments, the high activity devices are the set of devices that account for a large percentage of write activity. In some embodiments, the high activity devices are a set of devices that account for at least 50% of the write activity during the epoch. There are many ways of determining which devices are high activity devices depending on the embodiment. If the order of the entries of the high activity device data structure 315 are moving, particularly if the order of the highest activity devices are moving within the high activity device data structure 315, the high activity device data structure 315 has not reached steady state, and the total writes information will be aggregated for additional monitoring intervals. One example way to determine which devices are high activity devices is set forth below in connection with FIG. 12.

FIG. 6 is a functional block diagram of an example high importance device data structure 320 for use by the consistency group integrity application of FIG. 3 to determine a set of high importance devices, according to some embodiments. FIG. 7 is a functional block diagram of a portion of the example high importance device data structure of FIG. 6 in greater detail, according to some embodiments.

By determining a set of devices in the consistency group with high update activity, as well as those with the strongest update correlation to those high update devices, it is possible to determine a set of high importance devices. Knowing which devices of the consistency group are high importance devices can be used in disaster recovery automation solutions, such as GDDR (Geographically Dispersed Disaster Restart) to prioritize management of these devices, for example making them read/write for business recovery. GDDR could also perform device state checks for just this subset of devices during local replication operations, instead of for all devices in the consistency group, resulting in improved performance. Another application could be to prioritize the high importance devices in cyber recovery, by limiting data validation to the devices identified as being of high importance.

As shown in FIG. 6, in some embodiments the high importance device data structure 325 is a table, having a row for every possible pair of devices 140, where one device 140 is a high activity device within the consistency group 200 and one device 140 is a low activity device within the consistency group 200. For example, in FIG. 6, Row 1 is created for device HIGH #1 and device LOW #1. Row 2 is created for device HIGH #1 and device LOW #2. Row n of device pairing data structure 325 is associated with device HIGH #1 and device LOW #n. In this manner, high importance device data structure 320 includes one row for every possible pairing of devices 140, in which each pair includes one device 140 that is a high activity device in the consistency group 200 and one device 140 is a low activity device in the consistency group 200. Although the example high importance device data structure 320 shown in FIG. 6-7 is illustrated as a table, other data structure types may be used to implement the high importance device data structure 320.

As shown in FIG. 7, in some embodiments, each row 560 of the high importance device data structure 320 includes information about the devices 140, such as the storage system ID 600 and the device ID 605 of the high activity device and the low activity device. Including the storage system ID enables the device 140 to be identified on the particular storage system where the consistency group 200 includes devices 140 on multiple storage systems.

Each row 560 of the high importance device data structure 320 includes a first field containing a value indicating the number of times both devices 140 associated with the row are updated 620, and the number of times 625 that only one device 140 associated with the row is updated. After a number of intervals, a coordinated write probability percentage 628 is calculated, which indicates the percentage of the time that both devices of the row were written to in the same interval.

In some embodiments, the coordinated write probability is calculated as P=(number of intervals both devices are written to/number of intervals where one device was written to plus the number of intervals where both devices were written to). A high percentage value in a coordinated write probability 628 could indicate a possible write dependency between the devices 140 of that row, as this means that these two devices 140 are often updated together.

In addition, each interval, for each device 140 pair in the high importance device data structure 320, the consistency group integrity application 300 calculates a ratio 630 of the number of updates to the high activity device over the number of updates to the low activity device. Depending on the implementation, a number of ratios 630 may be tracked in the high importance device data structure 320. For each ratio 630, the high importance device data structure 320 keeps track of the number of intervals 635 in which that ratio 630 was seen, and the last interval 640 for which the ratio was seen. If a tracked ratio is no longer seen after a predetermined number of intervals, it is removed from the table. When a new ratio is seen for a given device 140 pair, it is inserted into the table if there is an open slot or would replace an older ratio if that older ratio was seen only once. After a predetermined number of intervals, the high importance device data structure 320 will contain ratios that occur the most often for each device 140 pair. A ratio that is seen a large number of times for a given device 140 pair could indicate possible write dependence, as this means that the two devices 140 are often updated in a similar pattern.

In some embodiments, the device activity data structure 310 includes information about the number of write operations that took place on each device of the consistency group during all intervals of the epoch, or during a subset of the intervals of the epoch. Once the set of high activity devices is determined, the high importance device data structure is created and populated with pairs of high activity/low activity devices. By saving this historical write data in the device activity data structure 310, it is possible to use this historical data to more quickly populate the coordinated write probability 628 and ratios 630 upon creation of the high importance device data structure 320. By maintaining this historical data, it is possible to accelerate convergence of the values of the high importance device data structure 320 to reduce the number of subsequent intervals that need to be monitored after creation of the high importance device data structure 320.

In some embodiments, the entries of the high importance device data structure 320 are updated in each interval. In some embodiments, all entries of the high importance device data structure 320 are updated in each interval. In some embodiments, only entries associated with devices 140 that had write activity during the interval are updated. For example, as described above, the device activity data structure 310 in some embodiments contains aggregated write information that occurred on each device 140 during the preceding interval. If a device 140 has write activity, the corresponding row 500 of the device activity data structure 310 is updated. This updated information then needs to be used to update the rows of the high importance device data structure 320.

In some embodiments, once the high importance device data structure 320 is created, the devices that are considered high activity devices are fixed, such that subsequent updates to the device activity data structure 310 are not used to change the order of devices within the high activity device data structure 315.

Since a particular device may appear in multiple rows of the high importance device data structure 320, in some embodiments, to enable the rows of the high importance device data structure 320 to be quickly identified, the high importance device data structure 320 has a meta table 550 in which the rows are the device IDs of the devices 140 that are the high activity devices, and the columns are the device IDs of the devices 140 that are low activity devices, and the entries are the row IDs 560 of the rows 500 of the high importance device data structure 320. If the device activity data structure 310 indicates that write activity occurred on a particular device, the meta data structure 550 can be used to quickly identify the set of row IDs associated with the device, to enable the high importance device data structure 320 to be quickly updated. For example, if there is write activity to device ID LOW #n, by reading the entries in column #n of the Meta Table 550, it is possible to quickly identify each of the rows 500 of the entries of the high importance device data structure 320 that need to be updated. Although a particular meta data structure 550 was shown in FIG. 6, other ways of locating relevant rows of the high importance device data structure 320 may likewise be used depending on the implementation.

Once the high importance device data structure 320 has reached a steady state, the set of high activity devices and the set of low activity devices that show a strong write correlation to at least one high activity devices are determined to be high importance devices. The other devices in the consistency group that are not determined to be high importance devices are referred to herein as "low importance devices."

It is possible that some of the low importance devices are able to be safely removed from the consistency group. By contrast, other devices that were determined to be low importance devices using the data structures of FIGS. 6 and 7, may be necessary devices and should not be removed from the consistency group. In some embodiments, an update correlation data structure (see FIGS. 8 and 9) constructed similar to the data structure of FIGS. 6 and 7 is used to look for correlated write activity between the low importance devices and high importance devices. If there is a strong write correlation between a low importance device and at least one of the high importance devices, the low importance device should be retained in the consistency group. If there is no write correlation between a low importance device and at least one of the high importance devices, that low importance device is a candidate for removal from the consistency group.

Figure 8:
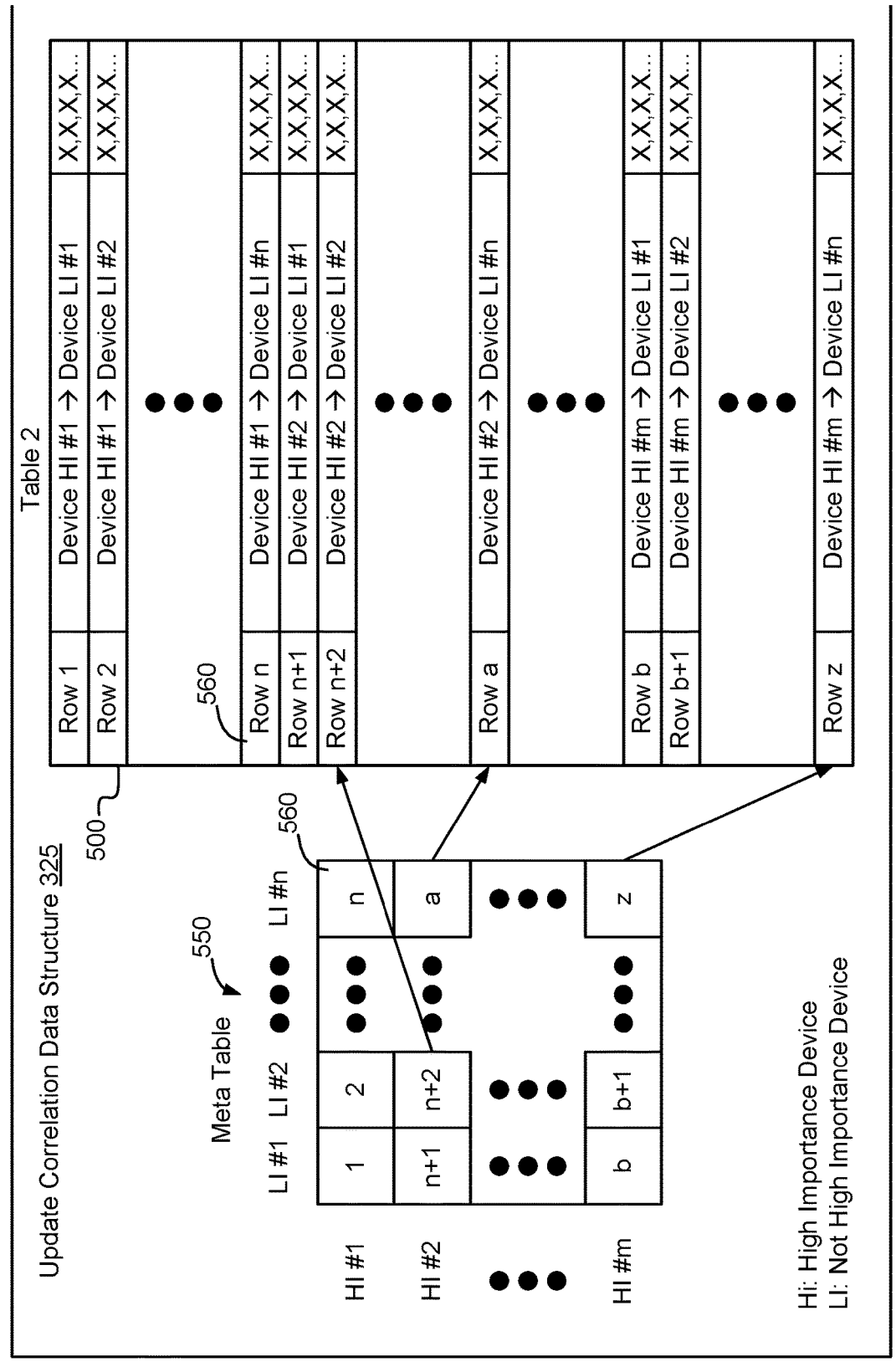
FIG. 8 is a functional block diagram of an example update correlation data structure for use by the consistency group integrity application of FIG. 3 to determine a set of candidate devices for removal from the consistency group, according to some embodiments.

FIG. 8 is a functional block diagram of an example update correlation data structure 320 for use by the consistency group integrity application of FIG. 3 to determine a set of candidate devices for removal from the consistency group, according to some embodiments. FIG. 9 is a functional block diagram of a portion of the example update correlation data structure of FIG. 8 in greater detail, according to some embodiments.

As shown in FIGS. 8-9, in some embodiments an update correlation data structure 325 is used to compare write operations of the HI (High Importance) devices (HI #1, HI #2, . . . HI #m) with write operations of each of the LI (Low Importance) devices (LI #1, L1 #2, . . . LI #n). Once the update correlation data table comes to a steady state, the coordinated write probability percentage 628 and ratio information that is contained in the update correlation data structure 325 is used to determine which of the low importance devices has exhibited coordinated write activity with at least one of the high importance devices. Any low importance device that exhibits coordinated write activity with at least one high importance device should be retained in the consistency group. Any low importance device that does not exhibit coordinated write activity with at least one high importance device is a candidate for removal from the consistency group.

As discussed in greater detail herein, in some embodiments one of the host applications 104 is a consistency group integrity application 300 associated with a learning process 330. Although FIG. 3 shows both the consistency group integrity application 300 and learning process 330 implemented on the same host 104, in other embodiments the two processes may be implemented on separate hosts 104.

In some embodiments, the consistency group integrity application 300 receives collections of information about operational characteristics of multiple consistency groups 200 and uses the collections of information to train the learning process 330 to learn write patterns associated with devices 140 that are candidates for removal from a consistency group 200.

FIGS. 10-11 are a flow chart of a method of creating a training example to be used to train a learning process 330 to identify write patterns indicative of a device 140 that is a candidate for removal from a consistency group 200, according to some embodiments.

As shown in FIG. 10, in some embodiments a consistency group 200 is created which includes a subset of devices 140 on one or more storage systems (block 1000). The consistency group 200, at this stage, is intentionally created to include all required devices 140.

An adjusted consistency group 200' is then created by adding one or more devices to the consistency group 200 that are not required to be included in the consistency group (block 1005). By adding one or more extra devices, it is possible to monitor the write dependencies between the high importance devices and the additional device, using the data structures described above in connection with FIGS. 4-9. The data patterns that emerge are used to create a training example for the learning process 330, so that the learning process 330 can learn write patterns associated with devices that are candidates for removal from a consistency group.

Although the description will refer to "adding" a device to a consistency group 200, in some embodiments the device is only constructively added to the consistency group 200 by adding the identity of the device that is to be "added" to the consistency group, without actually adding the device 140 to the consistency group 200. This has the advantage of enabling training examples to be created using live customer data access operations on deployed storage systems, without affecting the integrity of the protection afforded to the customer data. Likewise, multiple training examples may be created from the same set of customer data, by processing the collected write data multiple times, each time with a different device constructively "added" to the consistency group.

Optionally, the device ID of the device that is added to the consistency group is retained (block 1010) and provided to the learning process 330 as part of the training example (see FIG. 11, block 1145).

As shown in FIG. 10, after creating the adjusted consistency group 200' by adding a device 140 to the consistency group 200, write operations on all devices 140 of the adjusted consistency group 200' are monitored, for example using device monitor 305, for an update interval (block 1015). An example update interval may be five minutes, although other update intervals may similarly be used depending on the implementation.

At block 1020, the device activity data structure 310 is populated with aggregated write operation information for each device 140 of the adjusted consistency group 200' during the update interval. In some embodiments, the number of write operations on each device 140 is counted during the interval, but the size of the write operations is not monitored. In some embodiments, the device activity data structure 310 is implemented using a table, such as the device activity data structure 310 shown in FIG. 4. Other data structures may likewise be used and the device activity data structure 310 shown in FIG. 4 is merely an example. Optionally, the number of writes for each interval of the epoch or a subset of the intervals of the epoch is stored in the device activity data structure 310.

Devices of the adjusted consistency group 200' are then ranked, to create an ordered list of devices based on the total number of write operations on the devices during the epoch (block 1025). In some embodiments, this ranked list is implemented as a high activity device data structure 315, such as the high importance device data structure shown in FIG. 5.

Different devices may receive different amounts of write operations during different intervals. Accordingly, in some embodiments total write operations on each of the devices of the adjusted consistency group 200' are monitored over a number of update intervals until the high activity device data structure achieves a steady state. As used herein, the term "steady state" is used to refer to a minimum of relative movement of the highest activity devices within the high activity device data structure. Since the purpose of the high activity device data structure is to determine which devices are considered "high activity devices", as long as the identity of the highest activity devices is not changing, the high activity device data structure is considered to be at a steady state. The manner in which devices are determined to be high activity devices or low activity devices is described in greater detail below in connection with FIG. 11, block 1100. One example way of determining a set of devices that are considered to be a set of high activity devices is described in greater detail in connection with FIG. 12.

Accordingly, at block 1030 a determination is made as to whether the high activity device data 315 structure has reached a steady state. If the high activity device data structure 315 has not reached a steady state (a determination of NO at block 1030), the process of monitoring write operations iterates for additional intervals (block 1035). Once the high activity device data structure reaches a steady state (a determination of YES at block 1030), the process continues (block 1040) to FIG. 11.

As shown in FIG. 11, in some embodiments the high activity device data structure is used to determine a subset of devices in the adjusted consistency group 200' that have high write activity. All devices in the adjusted consistency group 200' that are not "high activity devices" are considered to be low activity devices (block 1100). The extra device that was added to the consistency group to create the adjusted consistency group 200' in block 805 may be a high activity device or a low activity device, depending on the aggregate activity level of that device. In some embodiments, devices that tend to have low write activity are preferentially selected to be added to the consistency groups to create the adjusted consistency groups 200', such that the added devices are more likely to be low activity devices.

Figure 12:
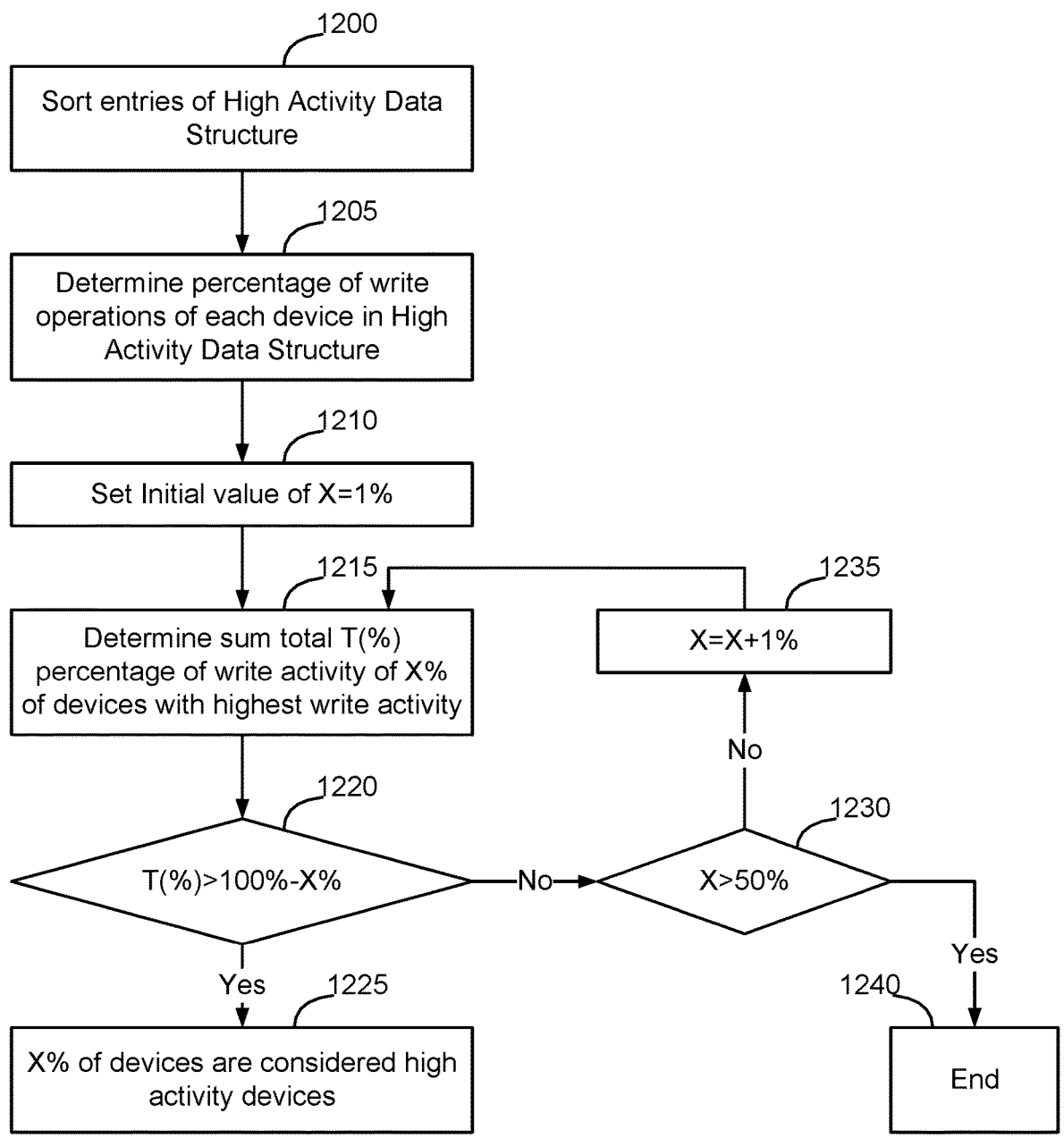
FIG. 12 is a flow chart of a method of determining a set of high activity devices, according to some embodiments.

FIG. 12 is a flow chart of a method of determining a set of high activity devices, according to some embodiments. In some embodiments, to determine which devices are considered "high activity devices", the entries of the device activity data structure are sorted by the total number of write IOs across all intervals, in decreasing order (block 1200). The total sum of the total write IOs on all devices of the adjusted consistency group 200' is then calculated. The percentage write of each device is then determined (block 1205). The process then evaluates the total write activity T % for the X % of devices, starting with X=1% (blocks 1210, 1215).

At block 1220, a determination is made as to whether the sum total write IOs for the top X % of devices is greater than or equal to 100–X % of the sum of total write IOs for all devices of the adjusted consistency group 200' (T %≥100%–X %). If the total write % of the X % of devices is greater than or equal to 100%–X % (a determination of YES at block 1220) then this X % subset of devices is considered the high update devices (block 1225). Otherwise, X is incremented by 1 (X %=X %+1%) and the process iterates until the lowest value of X is found such that X % of devices are responsible for 100–X % of all write IOs on the adjusted consistency group 200'. For example, if 2% of the devices account for 98% of the sum of total write IOs, then those 2% of devices are considered "high update devices" and all others are low update devices. In some embodiments, if X reaches a particular value, such as 49, the process stops and a determination is made that no devices are high activity devices. For example, as shown in FIG. 12, if T % is determined to not be greater than or equal to 100%–X % (a determination of NO at block 1220), in some embodiments a check is implemented to determine if X is greater than 50% at block 1230. If X is less than or equal to 50% (a determination of NO at block 1230), X is incremented in block 1235 and the process of blocks 1215 and 1220 iterates. If X is greater than 50%, the process ends (block 1240). Specifically, if the top 50% of devices are only responsible for 50% of write IOs, it can be determined that there is a relatively even distribution of write IOs across all devices. In this instance, the training example is discarded since there are no high activity devices.

Returning now to FIG. 11, at block 1105 a determination is made as to whether there are any high activity devices. If there are no high activity devices (a determination of NO at block 1105), the process ends (block 1110). If there are high activity devices (a determination of YES block 1105), at block 1115, a high importance data structure is created (See FIGS. 6-7) and used to determine a set of high importance devices. An update correlation data structure is then created (See FIGS. 8-9) and used to determine a set of drives that have minimal coordinated write activity with any of the high importance devices (block 1120). Those drives are candidate devices for removal from the consistency group.

In some embodiments, write patterns on the pairs of devices are observed over subsequent monitoring intervals (block 1125). For example, if the monitoring intervals are 5 minutes in length, write operations on the set of devices 140 may be monitored for multiple monitoring intervals, to enable write operation patterns to develop within the entries of the update correlation data structure 325. Since one of the devices that should not have been part of the consistency group was added in block 1005, the write patterns that develop are indicative of a consistency group that has a device that is a candidate for removal. Example write operation patterns that may show that a device is a candidate for removal from a consistency group include (1) the device is not a high importance device; and (2) that there is a very low coordinated write probability between the device and any of the high activity devices.

In some embodiments, the write operation patterns of the update correlation data structure are monitored over a number of monitoring intervals and a determination is made at block 1130 if the write patterns have reached a steady state. If the write operation patterns are continuing to develop (a determination of NO at block 1130), then the process iterates for additional update intervals (block 1135). Once the write patterns have stabilized (a determination of YES at block 1130), the update correlation data structure 325 contains information describing the write patterns between a set of high importance devices and a set of low importance devices of the consistency group. Since the update correlation data structure 325 also includes entries for the device that was added at block 1005, the update correlation data structure also contains information describing write patterns for a consistency group that contains at least one device that is a candidate for removal from the consistency group. These write patterns are able to be used as a training example or testing example to train the learning process 330 (block 1140).

In some embodiments, the identity of the device 140 that was added to the consistency group to create the adjusted consistency group 200' in block 1005 is stored (FIG. 10, block 1010), and is added to the training example (FIG. 11, block 1145). This enables the learning process 330 to focus on the data patterns associated with the added device to learn write patterns indicative of a device that is a candidate for removal from a consistency group.

In some embodiments, if the device that was added to the consistency group at FIG. 10, block 1010 is a high activity device, the training example is discarded.

Figure 13:
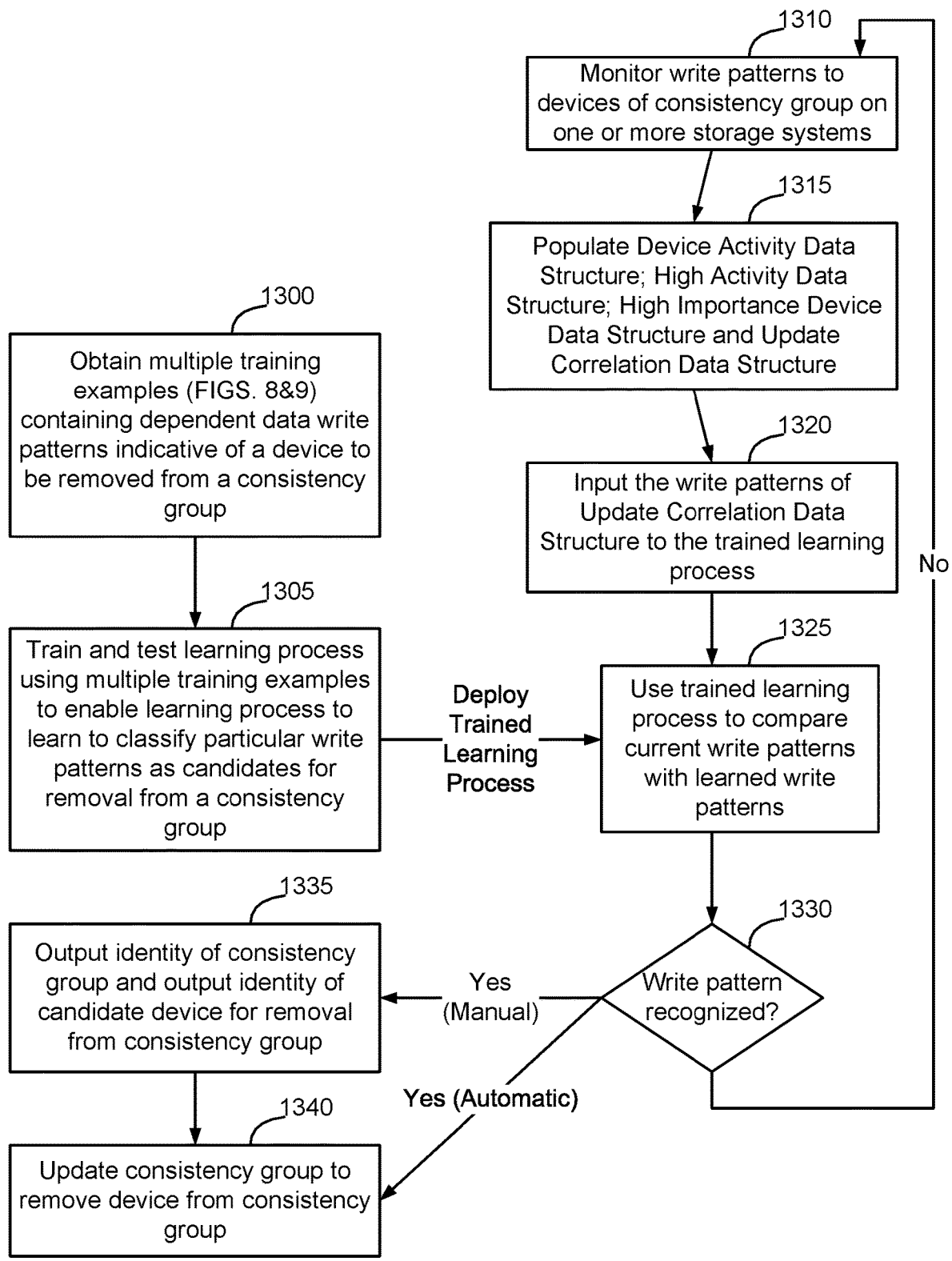
FIG. 13 is a flow chart of a method of using the training examples created using the process of FIGS. 10-11 to train a learning process to identify write patterns indicative of a devices that are candidates for removal from a consistency group, and using the deployed trained learning process to identify devices that are candidates for removal from a consistency group, according to some embodiments.

FIG. 13 is a flow chart of a method of training a learning process 330 to identify write patterns indicative of a device 140 that is a candidate for removal from a consistency group 200, and using the deployed trained learning process 330 to identify devices 140 that are candidates for removal from a consistency group 200, according to some embodiments.

In some embodiments, the process shown in FIGS. 10-11 is iterated multiple times with different consistency groups 200 and with different added devices 140 to generate a large number of training examples. As noted above, the same storage system write data can be used with different constructively added devices and processed multiple times to create multiple training examples using the same storage system write data. To enable write information about a given consistency group to be used to create multiple training examples, in some embodiments write operations about multiple additional extra devices is determined over the given set of intervals, so that the individual extra devices may be constructively added. For example, if write operations on a consistency group were to be used to create 50 training examples, write operations on 50 additional devices would be monitored over the set of intervals so that the 50 individual devices could be constructively added at block 1005 to enable 50 individual training examples to be created using the method shown in FIGS. 10-11.

Once a large number of training examples are generated, which contain data write patterns indicative of devices 140 that are candidates for removal from a consistency group 200 (block 1300), the examples are used to train and test a learning process 330 (block 1305). In some embodiments, multiple training examples are used to enable the learning process 330 to learn to classify particular write patterns as indicative of a device 140 that is a candidate for removal from a consistency group 200.

In some embodiments, the learning process 330 is a supervised learning process configured to implement a classification process that is trained to identify a device 140 as a candidate for removal from a consistency group 200. On other embodiments, the learning process 330 is a supervised learning process configured to implement a regression learning process that is trained to learn a regression between an independent variable (write patterns) and a dependent variable (percentage probability that a device should be removed from a consistency group), to enable the learning process 330 to output a probability that a particular set of devices 140 should be removed from a consistency group 200 when presented with current write patterns on the devices of the consistency group.

As shown in FIG. 13, once the learning process 330 is trained, the learning process 330 is deployed and used to monitor write patterns of devices within a consistency group, by monitoring write patterns of high importance devices and low importance devices of the consistency group 200. Specifically, as shown in FIG. 13, at block 1310 the consistency group integrity application 300 monitors write patterns of devices 140 of a consistency group 200 on one or more storage systems. In some embodiments, the device activity data structure 310, high activity device data structure 315, high importance device data structure 320, and update correlation data structure 325 described herein in connection with FIGS. 3-9 are used to establish write patterns for each monitored consistency group 200 (block 1315). By looking for write patterns using the same data structures that were used to train the learning process 330, it is possible to create write patterns in a manner similar to the manner in which the training examples were created.

In some embodiments, the update correlation data structure 325 that is created for the consistency group 200, is provided as input to the deployed trained learning process 330 and the deployed trained learning process 330 scans the rows 500 of the update correlation data structure 325 for the consistency group 200 looking for write patterns indicative that a device 140 should be a candidate for removal from the consistency group 200 (block 1325). As noted above, example write patterns may indicate the absence of dependent write operations on a particular set of devices, which would indicate that that set of devices are candidates for removal from the consistency group 200.

The trained learning process 330 looks for recognized write patterns (block 1330). In some embodiments, if the deployed trained learning process 330 does not recognize write patterns indicating that one or more of the devices should be removed from the consistency group (e.g. the write patterns indicate correlated write activity between all low importance devices and at least a respective high importance device) (a determination of NO at block 1330) the process continues to monitor write patterns to determine if write patterns indicating a lack of write correlation develop over time. Optionally, write pattern observations may cease after a certain period of time once it is certain that there are no devices 140 that are candidates for removal from the consistency group 200.

If the trained learning process 330 recognizes a write pattern in the current write patterns that indicates that one or more of the devices is not exhibiting dependent write activity with any of the high importance devices (a determination of YES at block 1330), the respective low importance device is a candidate for removal from the consistency group 200. The manner in which the consistency group integrity application 300 operates will depend on whether manual intervention is required or whether automatic changes to the consistency group 200 are allowed. In a manual mode of operation, the consistency group integrity application 300 outputs an identity of a consistency group 200 and the identity of the device 140 that was determined to be a candidate for removal from the consistency group 200 (block 1335). This information may be provided to a system administrator or other person, for example in the form of a text message or user interface alarm message, to enable the person to take corrective action. For example, the person can then approve removal of the device 140 from the consistency group 200 (block 1340). In an automatic mode of operation, the consistency group integrity application 300 automatically removes the device 140 from the consistency group 200 (block 1340) and, optionally, notifies the system administrator of the action that was taken.

Although separate data structures are shown in FIGS. 4-7 to illustrate how aspects of the data can be processed to form training examples and to analyze consistency group write patterns, it should be understood that a common data structure may be used to store the data shown in FIGS. 4-9.

While the preceding description has focused on instances where it is desirable to determine candidate devices for removal from a consistency group, there are also instances where it would be desirable to determine candidate devices for inclusion in the consistency group.

Figure 14:
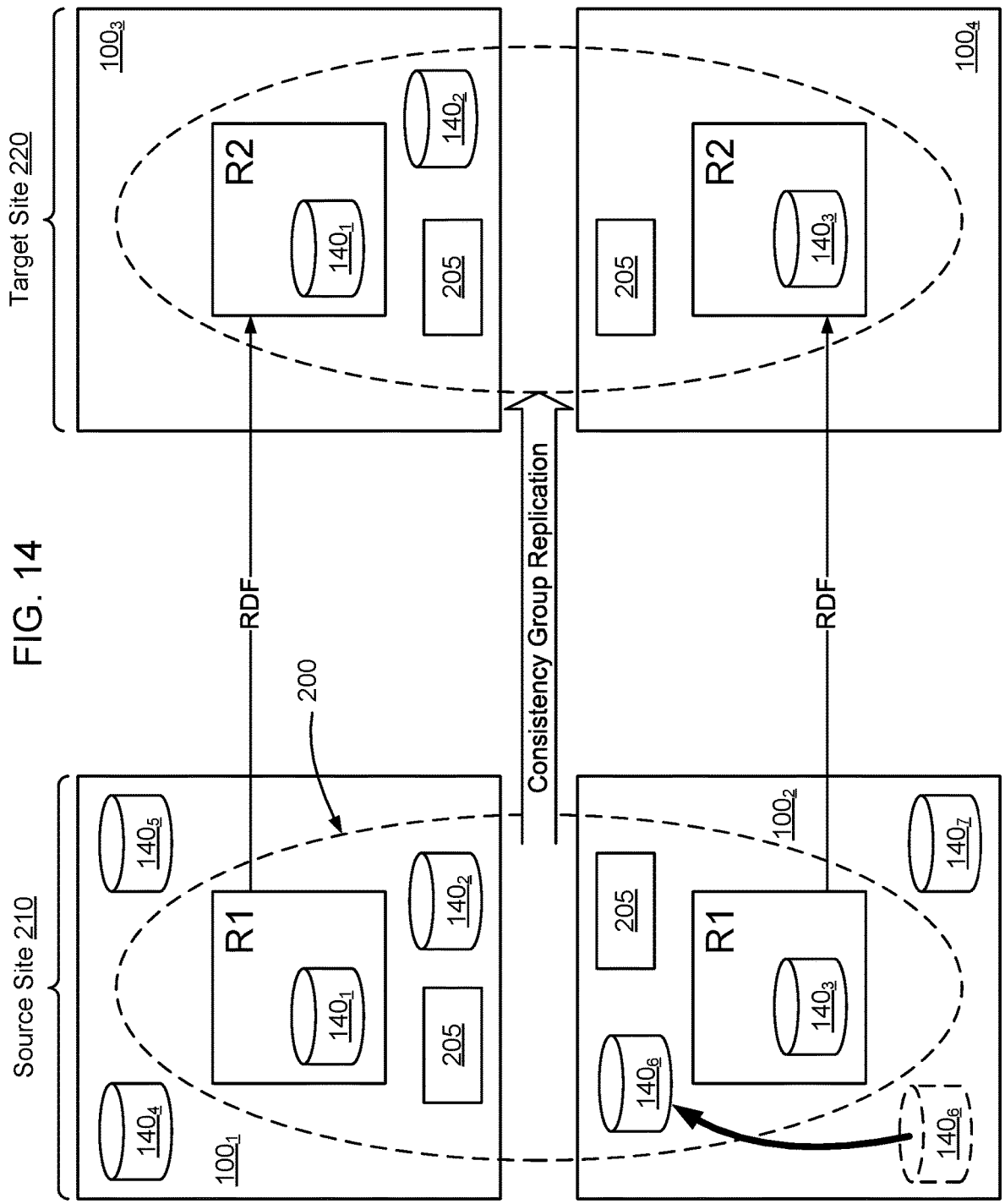
FIG. 14 is a functional block diagram of a set of storage systems having a group of devices forming a consistency group, with one device missing from the consistency group, according to some embodiments.

FIG. 14 is a functional block diagram of a set of storage systems having a group of devices 140 forming a consistency group 200, according to some embodiments. When a consistency group 200 is defined, it is possible that one or more devices 140 are inadvertently not included in the consistency group 200. For example, as shown in FIG. 14, assume consistency group 200 has been defined and is being managed by a consistency group management application 205. For example, if device $140_6$ contains a log file associated with device $140_2$, it would be preferable to include device $140_6$ in the consistency group 200.

Write operations on devices 140 that are not included in the consistency group 200, such as devices $140_4$, $140_5$, $140_6$, are not managed by the consistency group management application 205. If a required device is not included in the consistency group 200, such as device $140_6$, the consistency group management application 205 will not prevent writes on that device from occurring, when write operations are stopped on the devices that are included in the consistency group 200.

This can be problematic and make it difficult or impossible for failover to target site 220 to occur. Specifically, in the event of a failure, the consistency group management application 205 stops write operations on all devices 140 of the consistency group 200, to preserve dependent write logic across the set of devices 140 within the consistency group 200. If the dependent write logic requires write operations to be performed on a device that is not part of the consistency group 200, the consistency group management application 205 will not stop continued writes on that device 140 in the event of a failure. As a result, not including a required device 140 in a consistency group 200 can cause data to be present on the target site 220 that should not be there, making it impossible for the business to be restarted on the target site 220.

According to some embodiments, a learning process 1505 (see FIG. 16) is trained to look for write patterns indicative of dependent write operations. Rather than looking for dependent write patterns between all devices of the consistency group and all devices outside of the consistency group, the learning process is trained to only learn write patterns indicative of dependent write operations between high activity devices of the consistency group and devices outside of the consistency group. Where the high activity devices are a small percentage of the devices of the consistency group, for example on the order of between 1% and 5% of devices of the consistency group, this can greatly simplify the amount of storage and processor resources required to determine dependent write patters, when compared with looking for dependent write patterns between all of the devices inside the consistency group and devices outside of the consistency group. The trained learning process 1505 is then deployed to watch write patterns between high activity devices of the consistency group and devices outside of the consistency group, to identify devices 140 that should have been included in a consistency group 200.

An example process of learning dependent write patterns between all members of a consistency group 200 and all devices outside of a consistency group is described in U.S. patent application Ser. No. 16/855,315, filed Apr. 22, 2020, the content of which is hereby incorporated herein by reference. The method and apparatus described herein in connection with FIGS. 14-19 optimizes the process described in this earlier patent application, by first determining a set of high activity devices of the consistency group, and then looking for dependent write patterns between the high activity devices of the consistency group and all devices outside of the consistency group. Optionally, the process described herein in connection with FIGS. 1-13 may be used in coordination with the process described in connection with the earlier filed application and/or the process described herein in connection with FIGS. 14-19, such that the consistency group integrity application 300 looks both for devices that have been omitted from the consistency group, as well as looks for devices that are candidates for removal from the consistency group. In this manner, the consistency group integrity application 300 can determine optimal membership in the consistency group 200.

Figure 15:
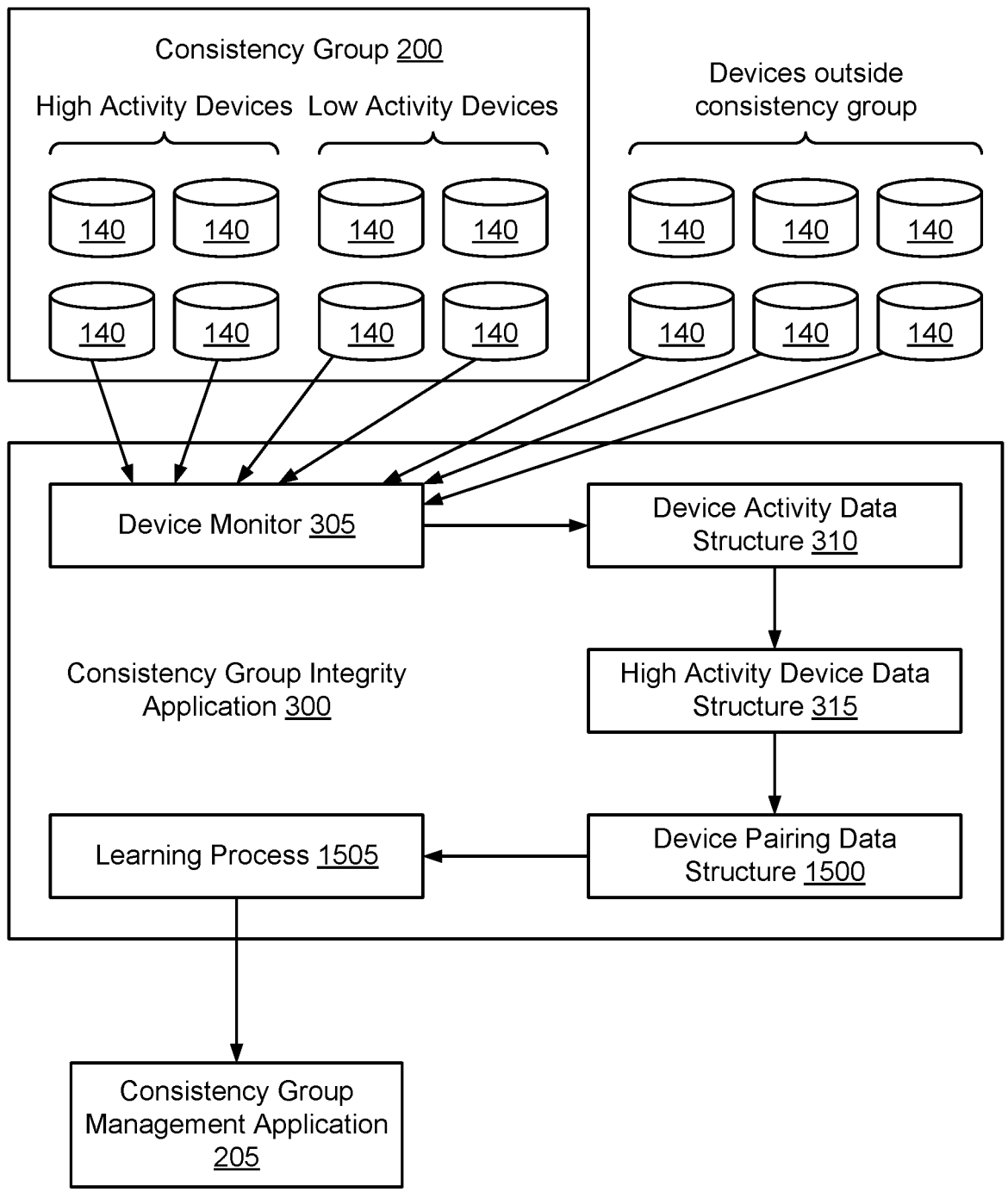
FIG. 15 is a functional block diagram of a storage environment including a consistency group integrity application configured to monitor device activity to identify devices missing from a consistency group, according to some embodiments.

FIG. 15 is a functional block diagram of a storage environment including a consistency group integrity application 300 configured to monitor device activity to identify devices 140 missing from a consistency group 200, according to some embodiments. The components may be implemented as a host application 104 on host 102 or in another manner. FIG. 15 is similar to FIG. 3, except that the device consistency group integrity application 300 includes a device pairing data structure 1500 rather than an update correlation data structure 325. As discussed in greater detail below, the device pairing data structure 1500 is configured to compare write activity on high activity devices that are inside the consistency group, with write activity on devices outside of the consistency group, to be used look for dependent write operations and, in so doing, to identify candidate devices for inclusion in the consistency group 200.

As noted above, when defining a consistency group 200, customers sometimes miss some devices 140 that should be included in the consistency group 200. According to some embodiments, the consistency group integrity application 300 is configured to monitor write operations to high activity devices inside the consistency group and to monitor write operations on devices that are outside of the consistency group 200, to look for write patterns indicative of dependent write operations. If a write pattern is detected that indicates the presence of a dependent write to a device 140 outside of a consistency group 200, the consistency group integrity application 300 either automatically instructs the consistency group management application 205 to include the device 140 in the consistency group 200 or provides an alert (e.g. via the consistency group management application 205) indicating that the device 140 should be considered for inclusion in the consistency group 200.

As noted above, FIG. 15 is similar to FIG. 3, and the discussion set forth above about how to determine which devices are high activity devises therefore applies equally to FIG. 15. Specifically, the device activity data structure 310 and high activity device data structure 315 of FIG. 15 are described above in connection with FIGS. 4-5 and, as such, that discussion applies equally in connection with FIG. 15 and will not be repeated.

Once a set of high activity devices are determined, for example when the high activity device data structure 315 reaches steady state (see e.g. FIG. 10, block 1030), the device pairing data structure 1500 is created. An example device pairing data structure 1500 is shown in FIG. 16. The data structure shown in FIG. 16 is similar to FIG. 6, except that the device pairing data structure includes rows that compare write operations to each high activity device inside the consistency group 200 (HIGH #1-HIGH #m) and each device outside of the consistency group (OUT #1-OUT #n).

After the device pairing data structure 1500 is created, the device activity data structure 1500 is used to collect device activity data on the set of high activity devices and the set of devices that are not included in the consistency group. The device pairing data structure 325 uses aggregated write information from the device activity data structure 310 and processes the aggregated write information to enable write operations to be evaluated within a current interval and over time. This enables write operations on each high activity device in the consistency group 200 to be compared to write operations on each device 140 outside of the consistency group 200. Where write patterns are detected between a pair of devices 140 (one high activity inside consistency group 200 and one device 140 outside of the consistency group 200), the device 140 outside of the consistency group 200 is a candidate device 140 to be added by the consistency group management application 205 to the consistency group 200.

In some embodiments, a learning process 1505 is used to look for patterns in the write operations. A process of training the learning process 1505 to learn write patterns indicative of a device 140 that has been incorrectly not included in a consistency group 200 is described below in greater detail in connection with FIGS. 18-19. In some embodiments, the learning process 1505 is a deep neural network learning process, although other recursive learning processes or classification learning processes may be used depending on the implementation.

FIG. 16 is a functional block diagram of an example device pairing data structure 1500, and FIG. 17 shows several entries of the example device pairing data structure 1500 in greater detail. As shown in FIG. 16, in some embodiments the device pairing data structure 1500 is a table, having a row for every possible pair of devices 140, where one device 140 is a high activity device inside the consistency group 200 and one device 140 is outside the consistency group 200. For example, in FIG. 16, Row 1 is created for high activity device HIGH #1 and device OUT #1. Row 2 is created for high activity device HIGH #1 and device OUT #2. Row n of device pairing data structure 1500 is associated with high activity device HIGH #1 and device OUT #n. In this manner, device pairing data structure 1500 includes one row for every possible pairing of devices 140, in which each pair includes one high activity device 140 that is inside the consistency group 200 and one device 140 that is outside of the consistency group 200. Although the example device pairing data structure 1500 shown in FIG. 16 is illustrated as a table, other data structure types may be used to implement the device pairing data structure 1500.

As shown in FIG. 17, in some embodiments, each row of the device pairing data structure 1500 includes information about the devices 140, such as the storage system ID 600 and the device ID 605 of the high activity device 140 that is included in the consistency group 200, and the storage system ID 610 and device ID 615 of the device 140 that is not included in the consistency group 200. Including the storage system ID enables the device 140 to be identified on the particular storage system where the consistency group 200 includes devices 140 on multiple storage systems.

Each row 500 of the device pairing data structure 1500 includes a first field containing a value indicating the number of times both devices 140 associated with the row are updated 620, and the number of times 625 that only one device 140 associated with the row is updated. After a number of intervals, a coordinated write probability percentage 628 is calculated, which indicates the percentage of the time that both devices of the row were written to in the same interval. In some embodiments, the coordinated write probability is calculated as P=(number of intervals both devices are written to/number of intervals where one device was written to plus the number of intervals where both devices were written to). A high percentage value in a coordinated write probability 628 could indicate a possible write dependency between the devices 140 of that row, as this means that these two devices 140 are often updated together.

In addition, each interval, for each device 140 pair in the device pairing data structure 1500, the consistency group integrity application 300 calculates a ratio 630 of the number of updates to the high activity device 140 inside of the consistency group 200 over the number of updates to the device 140 outside of the consistency group 200. Depending on the implementation, a number of ratios 630 may be tracked in the device pairing data structure 1500. For each ratio 630, the device pairing data structure 1500 keeps track of the number of intervals 635 in which that ratio 630 was seen, and the last interval 640 for which the ratio was seen. If a tracked ratio is no longer seen after a predetermined number of intervals, it is removed from the table. When a new ratio is seen for a given device 140 pair, it is inserted into the table if there is an open slot or would replace an older ratio if that older ratio was seen only once. After a predetermined number of intervals, the device pairing data structure 1500 will contain ratios that occur the most often for each device 140 pair. A ratio that is seen a large number of times for a given device 140 pair could indicate possible write dependence, as this means that the two devices 140 are often updated in a similar pattern.

In some embodiments, the device pairing data structure 1500 is updated in each interval. In some embodiments, all entries of the device pairing data structure 1500 are updated in each interval. In some embodiments, only entries associated with devices 140 that had write activity during the interval are updated. For example, as described above, the device 140 activity data structure 310 in some embodiments contains aggregated write information that occurred on each device 140 during the preceding interval. If a device 140 has write activity, the corresponding row 500 of the data activity data structure 310 is updated. This updated information then needs to be used to update the rows of the device pairing data structure 1500.

Since a particular device may appear in multiple rows of the device pairing data structure 1500, in some embodiments, to enable the rows of the device pairing data structure 1500 to be quickly identified, the device pairing data structure 1500 has a meta table 550 in which the rows are the device IDs of the high activity devices 140 that are contained in the consistency group 200, the columns are the device IDs of the devices 140 that are not contained in the consistency group 200, and the entries are the row IDs 560 of the rows 500 of the device pairing data structure 1500. If the device 140 activity data structure 310 indicates that write activity occurred on a particular device, the meta data structure 550 can be used to quickly identify the set of row IDs associated with the device, to enable the device pairing data structure 1500 to be quickly updated. For example, if there is write activity to device ID OUT #n, by reading the entries in column #n of the Meta Table 550, it is possible to quickly identify each of the rows 500 of the entries of the device pairing data structure 1500 that need to be updated. Although a particular meta data structure 550 was shown in FIG. 13, other ways of locating relevant rows of the device pairing data structure 1500 may likewise be used depending on the implementation.

As discussed in greater detail herein, in some embodiments one of the host applications 104 is a consistency group integrity application 300 associated with a learning process 1505. Although FIG. 15 shows both the consistency group integrity application 300 and learning process 1505 implemented on the same host 104, in other embodiments the two processes may be implemented on separate hosts 104.

In some embodiments, the consistency group integrity application 300 receives collections of information about operational characteristics of multiple storage systems 100 and uses the collections of information to train the learning process 1505 to learn write patterns associated with devices 140 that have been incorrectly omitted from a consistency group 200.

FIG. 18 is a flow chart of a method of creating a training example to be used to train a learning process 1505 to identify write patterns indicative of a device 140 missing from a consistency group 200, according to some embodiments.

As shown in FIG. 18, in some embodiments a consistency group 200 is created which includes a subset of devices 140 on one or more storage systems (block 1800). The consistency group 200, at this stage, is intentionally created to include all required devices 140. A set of high activity devices of the consistency group is then determined (block 1805), for example using the process described above in connection with FIG. 10 (blocks 1015-1035) and FIG. 12.

One of the low activity required devices 140 is then removed from the consistency group 200 (block 1810). By removing one of the required devices 140, it is possible to monitor the write dependencies using the data structures described above in connection with FIGS. 16-17, to create a training example for the learning process 1505. Although the description will refer to "removing" a device from a consistency group 200, in some embodiments the device is only constructively removed from the consistency group 200 by adding the identity of the device that is to be "removed" to the class of devices that are not included in the consistency group 200, without actually removing the device 140 from the consistency group 200. This has the advantage of enabling training examples to be created using live customer data access operations on deployed storage systems, without affecting the integrity of the protection afforded to the customer data. Likewise, multiple training examples may be created from the same set of customer data, by processing the collected write data multiple times, each time with a different device constructively "removed" from the consistency group.

Further, because the device pairing data structure is created to include entries only associated with high activity devices of the consistency group 200, in some embodiments multiple (all) low activity devices may be constructively removed from the consistency group 200 at block 1810 and added to the set of devices outside of the consistency group 200, such that the training example will show write dependencies between the high activity devices and more than one low activity device that should have been included in the consistency group.

As shown in FIG. 18, once the set of high activity devices of the consistency group has been identified in block 1805, the device pairing data structure 1500 is created to contain pairs of devices, in which each pair includes one of the high activity devices in the consistency group, and one device outside of the consistency group (block 1810). Since one or more of the low activity devices that should be contained in the consistency group was removed at block 1810, this removed device will be treated as one of the devices outside of the consistency group and, accordingly, the device pairing data structure will include entries correlating each of the high activity devices with the one or more low activity devices that was constructively removed from the consistency group.

Once the device pairing data structure 1500 is created, write operations on all of the high activity devices 140 and all devices that are not included in the consistency group of the set of storage systems is monitored, for example using device monitor 305 and device activity data structure 310 (block 1820). Where the consistency group 200 is implemented over devices 140 on two storage systems, as shown in FIG. 14, the devices 140 of both storage systems are monitored. Where the consistency group 200 is implemented over a larger set of storage systems 100, for example on a group of four storage systems, the devices 140 of all four storage systems are monitored at block 1820.

Write patterns are observed over a set of monitoring intervals to enable write operation patterns to develop within the entries of the device pairing data structure 1500. For example, if the monitoring intervals are 5 minutes in length, write operations on the set of devices 140 may be monitored for multiple monitoring intervals, to enable write operation patterns to develop within the entries of the device pairing data structure 1500. Since one of the devices that should have been part of the consistency group was removed in block 1810, the write patterns that develop are indicative of a consistency group that has a missing device. Example write operation patterns, as described above in connection with FIGS. 16-17, may be a high correspondence between write operations on the device 140 that was removed from the consistency group 200 and one or more high activity devices 140 of the consistency group 200. Likewise, a consistent ratio of a number of writes on the removed device and one or more of high activity devices of the consistency group 200 may indicate a pattern of dependent write operations.

In some embodiments, the write operation patterns of the device pairing data structure are monitored over a number of monitoring intervals and a determination is made at block 1830 if the write patterns have reached a steady state. If the write operation patterns are continuing to develop (a determination of NO at block 1830), then the process iterates for additional update intervals (block 1835). Once the write patterns have stabilized (a determination of YES at block 1830), the device pairing data structure 1500 contains information describing the write patterns between a set of high activity devices 140 that are part of a consistency group 200 and a device 140 that should have been included in the consistency group 200 but was removed at block 1810. These write patterns are able to be used as a training example or testing example to train the learning process 1505 (block 1840).

In some embodiments, the identity of the device 140 that was removed in block 1810 is stored, and only the data patterns associated with high activity devices 140 within the device pairing data structure 1500 that reference the removed device 140 are used to look for write patterns that describe the write dependence between the high activity devices and the missing device. For example, rather than looking at all devices 140 that are outside of the consistency group 200, in some embodiments the consistency group integrity application 300 accesses rows of the device pairing data structure 1500 that include the device ID 615 of the device 140 that was removed in block 1810, and uses those patterns as a training example. In some embodiments, the ID for the removed device is provided as part of the training example, as shown by dashed arrow 1845.

Figure 19:
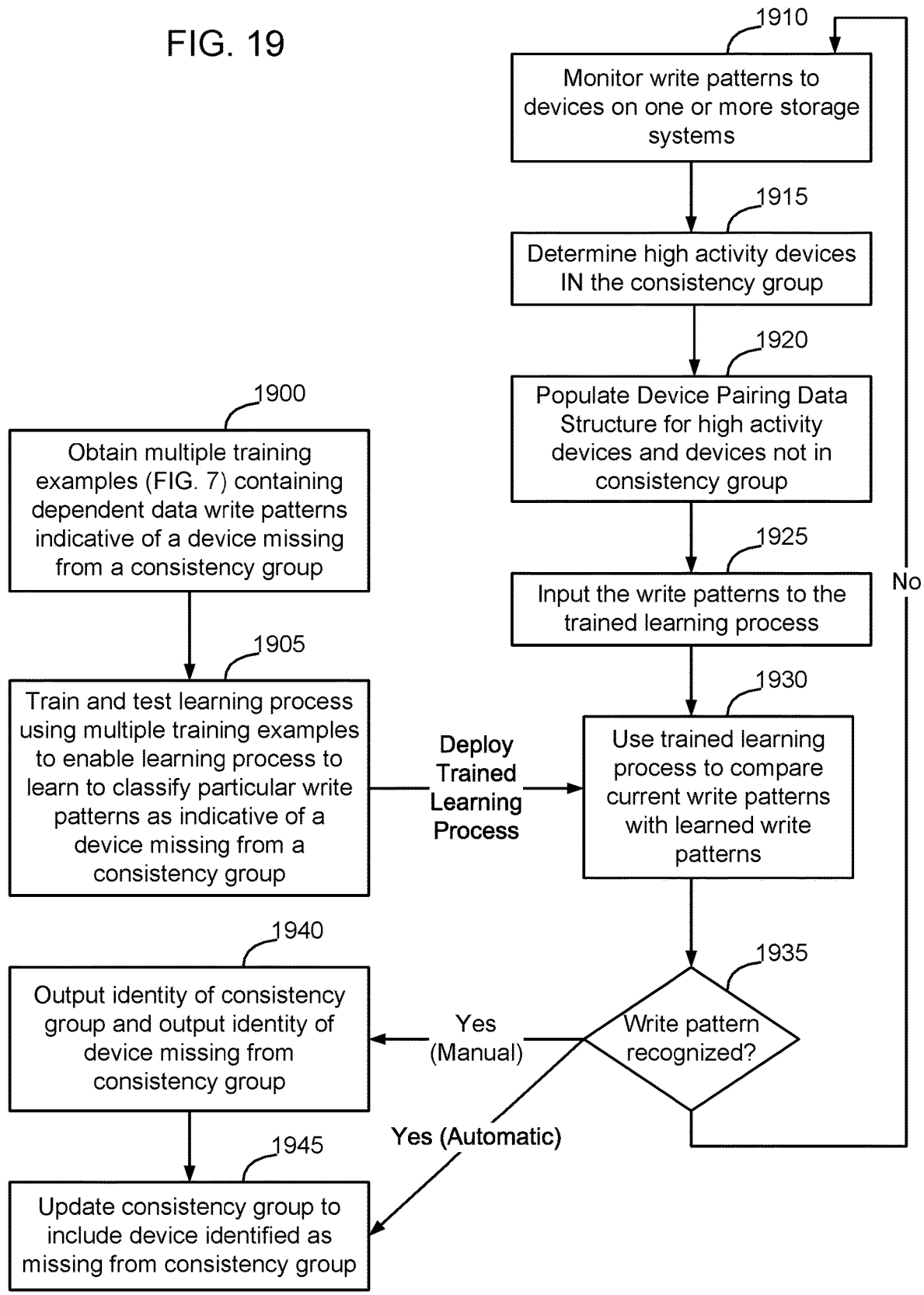
FIG. 19 is a flow chart of a method of using the training examples created using the process of FIG. 18 to train a learning process to identify write patterns indicative of a device missing from a consistency group, and using the deployed trained learning process to identify devices that are possibly missing from a consistency group, according to some embodiments.

FIG. 19 is a flow chart of a method of training a learning process 1500 to identify write patterns indicative of a device 140 missing from a consistency group 200, and using the deployed trained learning process 1505 to identify devices 140 that are possibly missing from a consistency group 200, according to some embodiments.

In some embodiments, the process shown in FIG. 18 is iterated multiple times with different consistency groups 200 and with different missing devices 140 to generate a large number of training examples. As noted above, the same storage system write data can be used with different constructively removed devices (block 1810) and processed multiple times to create multiple training examples using the same storage system write data.

Once a large number of training examples correlating data write patterns indicative of a device 140 missing from a consistency group 200 are obtained (block 1900), the examples are used to train a learning process 1505. In some embodiments, multiple training examples are used to enable the learning process 1505 to learn to classify particular write patterns as indicative of a device 140 missing from a consistency group 200.

In some embodiments, the learning process 1505 is a supervised learning process configured to implement a classification process that is trained to identify a device 140 as missing from a consistency group 200. In other embodiments, the learning process 1505 is a supervised learning process configured to implement a regression learning process that is trained to learn a regression between an independent variable (write patterns) and a dependent variable (percentage probability that a device should be included in a consistency group), to enable the learning process 1505 to output a probability that a particular device 140 should be included in a consistency group 200 when presented with a particular write pattern.

As shown in FIG. 19, once the learning process 1505 is trained, the learning process 1505 is deployed and used to monitor write patterns of high activity devices of a consistency group 200 and devices 140 that are not included in the consistency group 200. Specifically, as shown in FIG. 19, the consistency group integrity application 300 monitors write patterns of devices 140 of a consistency group (block 1910) and determines a set of high activity devices in the consistency group (block 1915). The consistency group integrity application 300 then creates and populates a device pairing data structure 1500 containing, as entries, pairs of high activity devices and devices outside of the consistency group. In connection with creation of the device pairing data structure 1500 for the current write activity, the low activity devices are not added to the set of devices considered "outside" of the consistency group. Rather, they the write patterns on the low activity devices are simply not monitored when looking at whether one or more devices that are outside of the consistency group should be added to the consistency group.

Once write patterns develop within the device pairing data structure 1500, the write patterns are input to the trained learning process (block 1925) and the trained learning process 1505 is used to compare the current write patterns of the consistency group with the set of learned write patterns (block 1930). By looking for write patterns using the same data structures that were used to train the learning function 1505, it is possible to create write patterns in a manner similar to the manner in which the training examples were created.

In some embodiments, the device pairing data structure 1500 created for the consistency group 200 is provided as input to the deployed trained learning process 1505 and the deployed trained learning process 1505 scans the rows 500 of the device pairing data structure 1500 for the consistency group 200 looking for write patterns indicative that a device 140 should be included in the consistency group 200 (block 1930). As noted above, example write patterns may indicate the presence of dependent write operations on the omitted device, which would indicate that the omitted device 140 should be included in the consistency group 200.

The trained learning process 1505 looks for recognized write patterns (block 1935). In some embodiments, if the deployed trained learning process 1505 does not detect a recognized write pattern with a sufficiently strong correlation (a determination of NO at block 1935) the process continues to monitor write patterns to determine if write patterns with sufficiently strong correlation develop over time. Optionally, write pattern observations may cease after a certain period of time once it is certain that there are no omitted devices 140 that should have been included in a consistency group 200.

If a write pattern is recognized that indicates the likelihood of a required device 140 being omitted from a consistency group 200 (a determination of YES at block 1935), the manner in which the consistency group integrity application 300 operates will depend on whether manual intervention is required or whether automatic changes to the consistency group 200 are allowed. In a manual mode of operation, the consistency group integrity application 300 outputs an identity of a consistency group 200 and the identity of the device 140 that was determined to likely need to be added to the consistency group 200 (block 1690). This information may be provided to a system administrator or other person, for example in the form of a text message or user interface alarm message, to enable the person to take corrective action. For example, the person can then approve entry of the device 140 to the consistency group 200 (block 1945). In an automatic mode of operation, the consistency group integrity application 300 automatically adds the device 140 to the consistency group 200 (block 1945) and, optionally, notifies the system administrator of the action that was taken.

Although separate data structures are shown in the various figures for simplicity of explanation of the various aspects of some embodiments, it should be understood that a common data structure may be used to store the data shown in the various figures.

In some embodiments, by first determining which devices of the consistency group are high activity devices, and then only looking for dependent write patterns between the high activity devices and the devices outside of the consistency group, it is possible to drastically reduce the required amount of processor and memory resources. For example, if 1% or 2% of the devices of the consistency group are determined to be the high activity devices, it is possible to reduce the size of the device pairing data structure by 98% or 99%, as compared to using the device pairing data structure to compare all devices inside the consistency group with all devices outside of the consistency group.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for identifying a device that is a candidate for removal from a consistency group, the computer program including a set of instructions which, when executed by a computer, cause the computer to perform a method comprising the steps of:
   defining a consistency group containing a first plurality of included devices, each of the first plurality of included devices residing on a respective storage system in a set of one or more storage systems, the one or more storage systems also containing a second plurality of non-included devices;
   monitoring write patterns on each of the first plurality of included devices for a first set of monitoring intervals;
   using the monitored write patterns to determine a subset of the first plurality of included devices that are high activity devices, wherein the devices of the first plurality of included devices that are not high activity devices comprise a subset of low activity devices;
   monitoring write patterns on each of the high activity devices and each of the low activity devices for a second set of monitoring intervals;
   comparing write patterns of each of the high activity devices with write patterns of each of the low activity devices over the second set of monitoring intervals; and
   determining from the compared write patterns a set of high importance devices;
   wherein the set of high importance devices includes the high activity devices and a subset of the low activity devices with coordinated write activity to at least one of the high activity devices.

2. The non-transitory tangible computer readable storage medium of claim 1, wherein the second set of monitoring intervals overlaps with the first set of monitoring intervals.

3. The non-transitory tangible computer readable storage medium of claim 1, wherein the step of using the monitored write patterns to determine a subset of the included devices that are high activity devices comprises populating a high activity device data structure with aggregated write information about each of the first plurality of included devices over the first set of monitoring intervals, and ordering the entries of the high activity device data structure according to the aggregated write information.

4. The non-transitory tangible computer readable storage medium of claim 3, wherein the step of monitoring write patterns is implemented for the first set of monitoring intervals until the high activity device data structure reaches a steady state.

5. The non-transitory tangible computer readable storage medium of claim 4, wherein the high activity device data structure is determined to be in the steady state when an order of the ordered entries, of the devices with highest write activity, stops changing between intervals.

6. The non-transitory tangible computer readable storage medium of claim 1, wherein the step of monitoring write patterns on each of the first plurality of included devices for the first set of monitoring intervals comprises populating a high activity device data structure with:
   interval write activity, for each of the included devices, for each monitoring interval of the first set of monitoring intervals; and
   aggregated write activity, for each of the included devices, for the first set of monitoring intervals.

7. The non-transitory tangible computer readable storage medium of claim 1, wherein the step of comparing write patterns of each of the high activity devices with write patterns of each of the low activity devices comprises populating a high importance device data structure with the monitored write information from the second set of monitoring intervals, the high importance device data structure having an entry for each possible pair of devices, in which each pair includes a respective high activity device and a respective low activity device.

8. The non-transitory tangible computer readable storage medium of claim 7, wherein each entry of the high importance device data structure includes a coordinated write probability percentage comparing a percentage of monitoring intervals in which both respective devices had write activity with monitoring intervals in which only one of the respective devices had write activity.

9. The non-transitory tangible computer readable storage medium of claim 8, wherein the step of determining, from the compared write patterns, that one of the low activity devices is a low importance device, comprises determining that the one of the low activity devices does not have a high coordinated write probability with any of the high activity devices.

10. The non-transitory tangible computer readable storage medium of claim 7, wherein at least some of the entries of the high importance device data structure further include ratios of numbers of write operations to respective pairs of high activity and low activity devices.

11. The non-transitory tangible computer readable storage medium of claim 10, wherein the step of determining, from the compared write patterns, that one of the low activity devices is a low importance device, comprises determining from the ratios that the one of the low activity devices is not consistently updated in coordination with any of the high activity devices.

12. The non-transitory tangible computer readable storage medium of claim 1, further comprising:
   monitoring write patterns on each of the high importance devices and each of the low importance devices for a third set of monitoring intervals, comparing write patterns of each of the high importance devices with write patterns of each of the low importance devices over the third set of monitoring intervals; and determining from the compared write patterns that one of the low importance devices is a candidate for removal from the consistency group.

13. A method of training a learning process to identify a device missing from a consistency group, the method comprising:

generating a set of training examples; and using the set of training examples to train a learning process to identify write patterns associated with a device that is a candidate for removal from the consistency group;

wherein each training example is created by:

creating a consistency group containing a first plurality of included devices, each of the first plurality of included devices residing on a respective storage system in a set of one or more storage systems, the one or more storage systems also containing a second plurality of non-included devices;

creating an adjusted consistency group to include each of the devices of the consistency group and at least one device from the second plurality of non-included devices;

monitoring first write patterns on each of the devices of the adjusted consistency group for a first set of monitoring intervals;

using the monitored first write patterns to determine a subset of the devices of the adjusted consistency group that are high activity devices, wherein the devices of the adjusted consistency group that are not high activity devices comprise a subset of low activity devices;

monitoring second write patterns on each of the high activity devices and each of the low activity devices for a second set of monitoring intervals;

using the monitored second write patterns to determine a subset of the devices of the adjusted consistency group that are high importance devices, wherein the devices of the adjusted consistency group that are not high importance devices comprise a subset of low importance devices;

monitoring third write patterns on each of the high importance devices and each of the low importance devices for a third set of monitoring intervals; and using the monitored third write patterns to determine fourth write patterns between the high importance devices and at least one device from the second plurality of non-included devices that was included to form the adjusted consistency group;

wherein the fourth write patterns are used as the training example of write patterns indicative of a device that is a candidate for removal from the consistency group.

14. The method of claim 13, wherein the first, second, and third sets of monitoring intervals overlap.

15. The method of claim 13, wherein the step of using the monitored first write patterns to determine a subset of the included devices that are high activity devices comprises populating a high activity device data structure with aggregated write information about each of the first plurality of included devices over the first set of monitoring intervals, and ordering the entries of the high activity device data structure according to the aggregated write information.

16. The method of claim 13, wherein the step of using the monitored second write patterns to determine the subset of the devices of the adjusted consistency group that are high importance devices comprises populating a high importance device data structure with the monitored write information from the second set of monitoring intervals, the high importance devices data structure having an entry for each possible pair of devices, in which each pair includes a respective high activity device and a respective low activity device.

17. The method of claim 13, wherein the step of using the monitored third write patterns to determine the fourth write patterns comprises populating an update correlation data structure with the monitored write information from the third set of monitoring intervals, the update correlation data structure having an entry for each possible pair of devices, in which each pair includes a respective high importance device and a respective low importance device.

18. The method of claim 17, wherein each entry of the high importance device data structure includes:

a coordinated write probability percentage comparing a percentage of monitoring intervals in which both respective devices had write activity with monitoring intervals in which only one of the respective devices had write activity; and ratios of numbers of write operations to respective pairs of high activity and low activity devices.

19. A method of training a learning process to identify a device missing from a consistency group, the method comprising:

generating a set of training examples; and using the set of training examples to train a learning process to identify write patterns associated with a device missing from a consistency group;

wherein each training example is created by:

defining a consistency group containing a first plurality of included devices, each of the plurality of included devices residing on a respective storage system in a set of one or more storage systems, the one or more storage systems also containing a second plurality of non-included devices that are not included in the consistency group;

determine a subset of the included devices that are high importance devices, wherein the included devices that are not high importance devices comprise a subset of low importance devices;

selecting one of the low importance devices for constructive removal from the consistency group;

monitoring write patterns on each of the high importance devices and on the selected low importance device; and comparing write patterns of each of the high importance devices with write patterns of the selected low importance device to determine coordinated write pattern activity between only the high importance devices and the selected low importance device, and using the compared write patterns as a label for training the learning process.

20. The method of claim 19, further comprising:

wherein the step of monitoring write patterns comprises creating a device pairing data structure having an entry for each possible pair of devices, in which each pair of devices includes a respective high importance device and the selected low importance device that was constructively removed from the consistency group;

wherein each entry of the device pairing data structure includes:

a coordinated write probability percentage comparing a percentage of monitoring intervals in which both respective devices had write activity with monitoring intervals in which only one of the respective devices had write activity; and ratios of numbers of write operations to respective pairs of high importance and low importance devices.

\* \* \* \* \*